United States Patent
Inoue

(10) Patent No.: US 6,366,953 B2
(45) Date of Patent: *Apr. 2, 2002

(54) SYSTEM AND METHOD FOR RECORDING A COMPRESSED AUDIO PROGRAM DISTRIBUTED FROM AN INFORMATION CENTER

(75) Inventor: Hiraku Inoue, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,980

(22) Filed: Aug. 3, 1998

(51) Int. Cl.[7] .............................................. G06F 15/16
(52) U.S. Cl. ...................... 709/219; 700/234; 386/124; 369/53.24
(58) Field of Search ........................... 711/4, 100, 234; 709/203, 237, 219; 386/40, 124; 369/53.24

(56) References Cited

U.S. PATENT DOCUMENTS

| | | | |
|---|---|---|---|
| 5,127,303 A | * 7/1992 | Tsumura et al. | 84/609 |
| 5,636,276 A | * 6/1997 | Brugger | 705/54 |
| 5,737,639 A | * 4/1998 | Ohmori | 710/73 |
| 5,748,485 A | * 5/1998 | Christiansen et al. | 700/234 |
| 5,768,528 A | * 6/1998 | Stumm | 709/231 |
| 5,784,646 A | * 7/1998 | Sawada | 710/38 |
| 5,790,935 A | * 8/1998 | Payton | 725/91 |
| 5,794,217 A | * 8/1998 | Allen | 705/27 |
| 5,808,992 A | * 9/1998 | Kuroda | 369/53.24 |
| 5,822,216 A | * 10/1998 | Satchell, Jr. et al. | 700/232 |
| 5,841,979 A | * 11/1998 | Schulhof et al. | 709/237 |
| 5,870,710 A | * 2/1999 | Ozawa et al. | 704/500 |
| 5,914,941 A | * 6/1999 | Janky | 370/313 |
| 6,012,086 A | * 1/2000 | Lowell | 709/218 |
| 6,119,144 A | * 9/2000 | Fujita et al. | 709/203 |
| 6,138,203 A | * 10/2000 | Inokuchi et al. | 711/103 |
| 6,161,106 A | * 12/2000 | Dailey et al. | 707/102 |
| 6,226,618 B1 | * 5/2001 | Downs et al. | 705/1 |

FOREIGN PATENT DOCUMENTS

| | | | | |
|---|---|---|---|---|
| JP | 407099630 A | * | 4/1995 | H04N/005/91 |
| JP | 408191427 A | * | 7/1996 | H04N/005/92 |

OTHER PUBLICATIONS

Stallings, William, Data and Computer Communications, Prentice Hall, Upper Saddle River, NJ, pp. 211–212, 1994.*
Brown, Mark R., Using Netscape 2.0, Que Corporation, p. 440, 1995.*
Press, Larry, "Net.Speech: Desktop Audio Comes to the Net", Communications of the ACM, personal computing, Oct. 1995, pp. 25–31.*
Glascock, Stuart, "Progressive Networks' RealAudio 4.0 makes its debut", Computer Reseller News, Manhasset, Jun. 16, 1997, p. 28.*
Atwood, Brett, "WinAmp", Billboard, New York, Aug. 23, 1997, p. 93.*
Morgenstern, Steve, "Technology", Rolling Stone Mar. 6, 1997, p. 83.*

* cited by examiner

Primary Examiner—Glenton B. Burgess
Assistant Examiner—Bradley Edelman
(74) Attorney, Agent, or Firm—Jay H. Maioli

(57) ABSTRACT

A method and apparatus distribution system in which compressed audio data and relevant information ancillary to the compressed audio, such as data size data, picture information and the text information, are packeted and transmitted or received on the packet basis by time divisional multiplexing.

9 Claims, 24 Drawing Sheets

|   | 16BITS | | 16BITS | |
|---|---|---|---|---|
|   | MSB      LSB | MSB      LSB | MSB      LSB | MSB      LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | MAKER CODE | MODEL CODE | FIRST TNO | LAST TNO |
| 8 | 00000000 | 00000000 | 00000000 | USED SECTORS |
| 9 | 00000000 | 00000000 | 00000000 | 00000000 |
| 10 | 00000000 | 00000000 | 00000000 | DISC SERIAL NO |
| 11 | DISC | ID | P-DFA | P-EMPTY |
| 12 | P-FRA | P-TNO1 | P-TNO2 | P-TNO3 |
| 13 | P-TNO4 | P-TNO5 | P-TNO6 | P-TNO7 |
| 74 | P-TNO248 | P-TNO249 | P-TNO250 | P-TNO251 |
| 75 | P-TNO252 | P-TNO253 | P-TNO254 | P-TNO255 |
| 76 | 00000000 | 00000000 | 00000000 | 00000000 |
| 77 | 00000000 | 00000000 | 00000000 | 00000000 |
| 78 | START ADDRES | | | TRACK MODE |
| 79 | END ADDRESS | | | LINK INFORMATION |
| 80 | START ADDRES | | | TRACK MODE |
| 81 | END ADDRESS | | | LINK INFORMATION |
| 82 | START ADDRES | | | TRACK MODE |
| 83 | END ADDRESS | | | LINK INFORMATION |
| 580 | START ADDRES | | | TRACK MODE |
| 581 | END ADDRESS | | | LINK INFORMATION |
| 582 | START ADDRES | | | TRACK MODE |
| 583 | END ADDRESS | | | LINK INFORMATION |
| 584 | START ADDRES | | | TRACK MODE |
| 585 | END ADDRESS | | | LINK INFORMATION |
| 586 | START ADDRES | | | TRACK MODE |
| 587 | END ADDRESS | | | LINK INFORMATION |

FIG.4

|     | 16BITS | | 16BITS | |
|---|---|---|---|---|
| | MSB        LSB | MSB        LSB | MSB        LSB | MSB        LSB |
| 0  | 00000000 | 11111111 | 11111111 | 11111111 |
| 1  | 11111111 | 11111111 | 11111111 | 11111111 |
| 2  | 11111111 | 11111111 | 11111111 | 00000000 |
| 3  | CLUSTER H | CLUSTER L | 00000000 | 00000010 |
| 4  | 00000000 | 00000000 | 00000000 | 00000000 |
| 5  | 00000000 | 00000000 | 00000000 | 00000000 |
| 6  | 00000000 | 00000000 | 00000000 | 00000000 |
| 7  | 00000000 | 00000000 | 00000000 | 00000000 |
| 8  | 00000000 | 00000000 | 00000000 | 00000000 |
| 9  | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | LINK INFORMATION | |
| 78 | DISC NAME/TRACK NAME | | | |
| 79 | DISC NAME/TRACK NAME | | LINK INFORMATION | |
| 80 | DISC NAME/TRACK NAME | | | |
| 81 | DISC NAME/TRACK NAME | | LINK INFORMATION | |
| 82 | DISC NAME/TRACK NAME | | | |
| 83 | DISC NAME/TRACK NAME | | LINK INFORMATION | |
| 584 | DISC NAME/TRACK NAME | | | |
| 585 | DISC NAME/TRACK NAME | | LINK INFORMATION | |
| 586 | DISC NAME/TRACK NAME | | | |
| 587 | DISC NAME/TRACK NAME | | LINK INFORMATION | |

FIG.8

| | 16BITS | | 16BITS | |
|---|---|---|---|---|
| | MSB          LSB | MSB          LSB | MSB          LSB | MSB          LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TRD1 | P-TRD2 | P-TRD3 |
| 13 | P-TRD4 | P-TRD5 | P-TRD6 | P-TRD7 |
| 14 | P-TRD8 | P-TRD9 | P-TRD10 | P-TRD11 |
| 15 | P-TRD12 | P-TRD13 | P-TRD14 | P-TRD15 |
| 16 | P-TRD16 | | | |
| 17 | | | | |
| 73 | | | | |
| 74 | P-TRD248 | P-TRD249 | P-TRD250 | P-TRD251 |
| 75 | P-TRD252 | P-TRD253 | P-TRD254 | P-TRD255 |
| 76 | RECORDING DATE AND TIME | | | |
| 77 | | | MAKER CODE | MODEL CODE |
| 78 | RECORDING DATE AND TIME | | | |
| 79 | | | MAKER CODE | MODEL CODE |
| 80 | RECORDING DATE AND TIME | | | |
| 81 | | | MAKER CODE | MODEL CODE |
| 82 | RECORDING DATE AND TIME | | | |
| 83 | | | MAKER CODE | MODEL CODE |
| 84 | RECORDING DATE AND TIME | | | |
| 85 | | | | LINK INFORMATION |
| 86 | | | | |
| 586 | RECORDING DATE AND TIME | | | |
| 587 | | | | LINK INFORMATION |

FIG.9

|   | 16BITS | | 16BITS | |
|---|---|---|---|---|
|   | MSB        LSB | MSB        LSB | MSB        LSB | MSB        LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 14 | P-TNA8 | P-TNA9 | P-TNA10 | P-TNA11 |
| 15 | P-TNA12 | P-TNA13 | P-TNA14 | P-TNA15 |
| 16 | P-TNA16 | | | |
| 17 | | | | |
| 73 | | | | |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | | LINK INFORMATION |
| 78 | DISC NAME OR TRACK NAME | | | |
| 79 | DISC NAME OR TRACK NAME | | | LINK INFORMATION |
| 80 | DISC NAME OR TRACK NAME | | | |
| 81 | DISC NAME OR TRACK NAME | | | LINK INFORMATION |
| 82 | DISC NAME OR TRACK NAME | | | |
| 83 | DISC NAME OR TRACK NAME | | | LINK INFORMATION |
| 84 | DISC NAME OR TRACK NAME | | | |
| 85 | DISC NAME OR TRACK NAME | | | LINK INFORMATION |
| 86 | DISC NAME OR TRACK NAME | | | |
| 586 | DISC NAME OR TRACK NAME | | | |
| 587 | DISC NAME OR TRACK NAME | | | LINK INFORMATION |

FIG.10

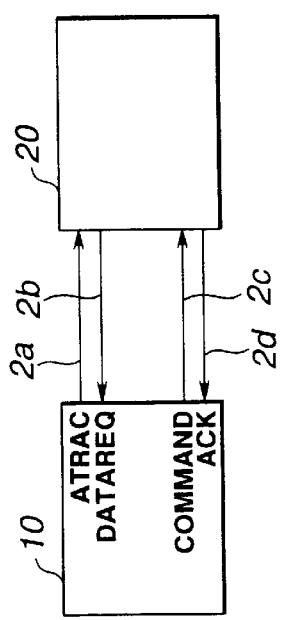
FIG.12A
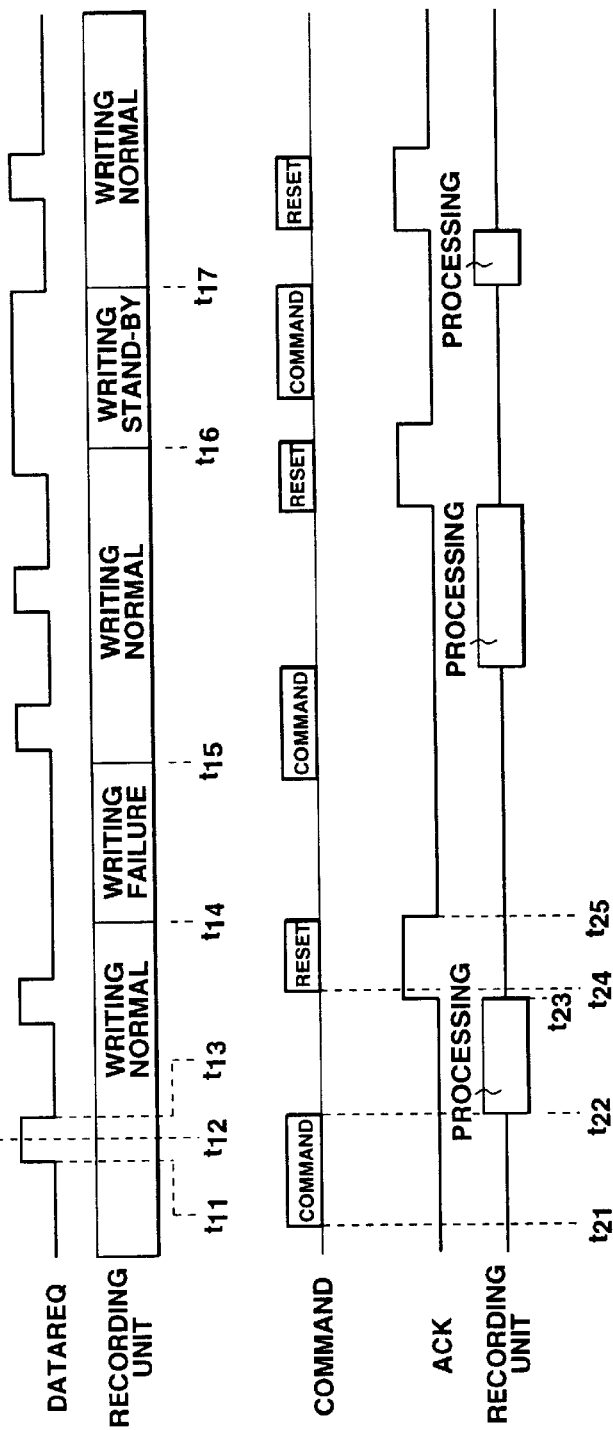
FIG.12B
FIG.12C

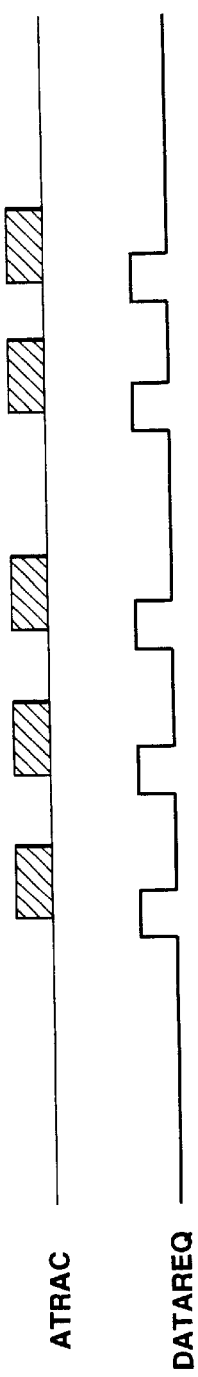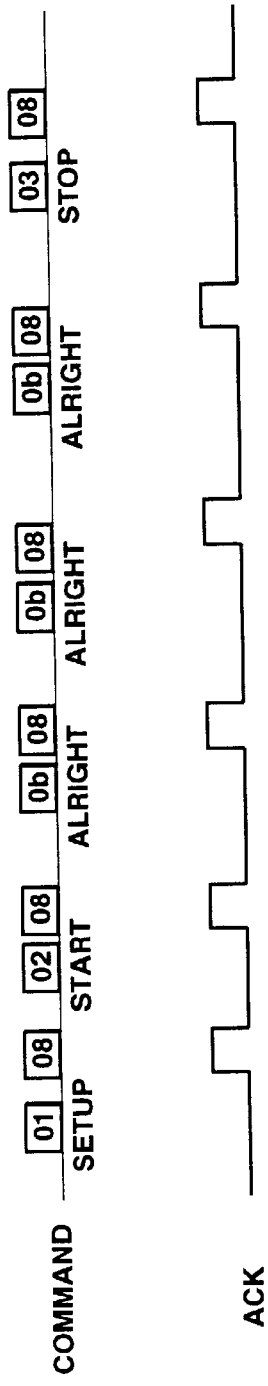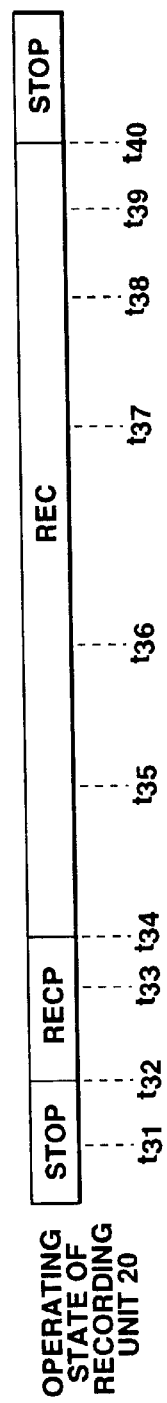

FIG.16A
FIG.16B
FIG.16C
FIG.16D

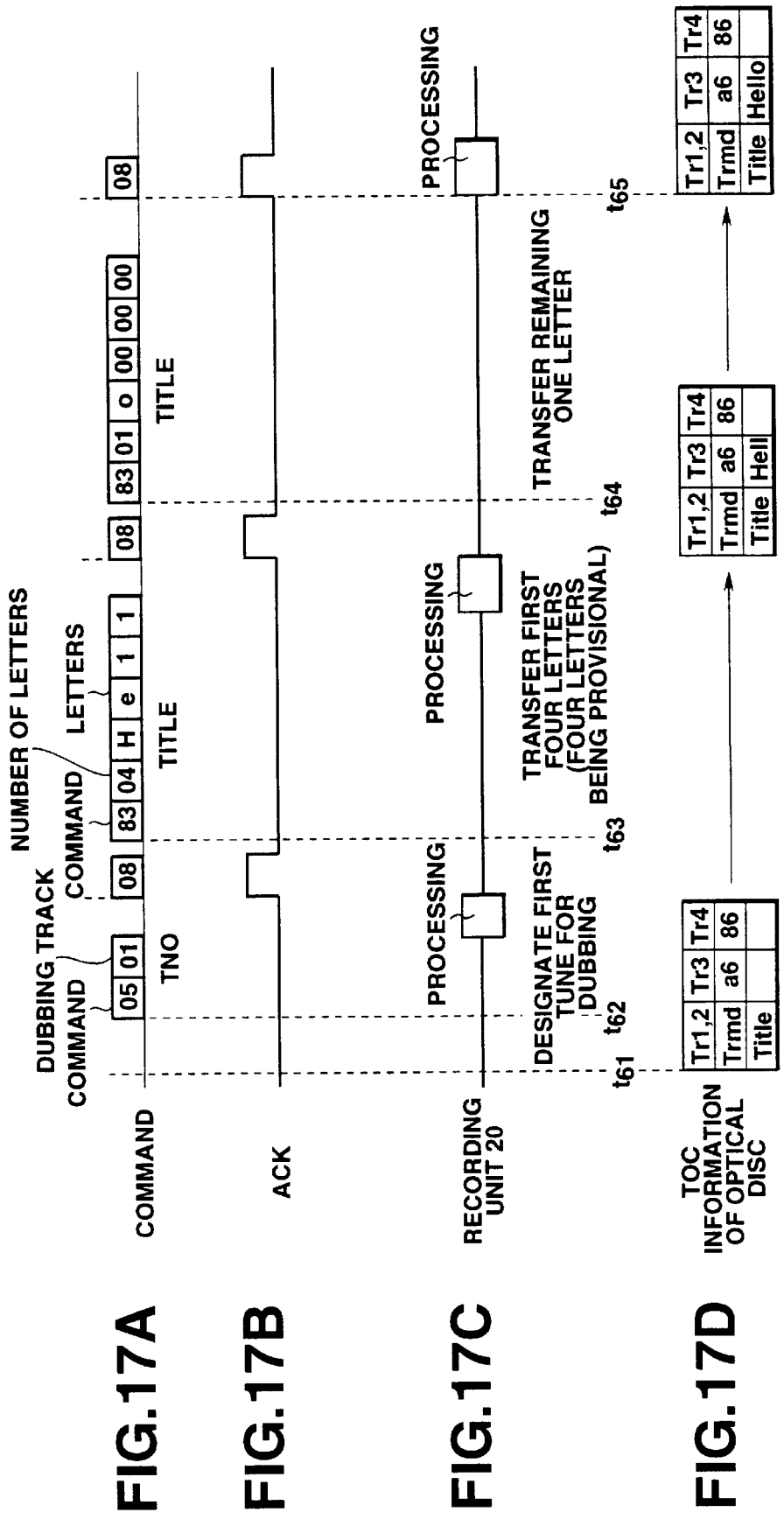

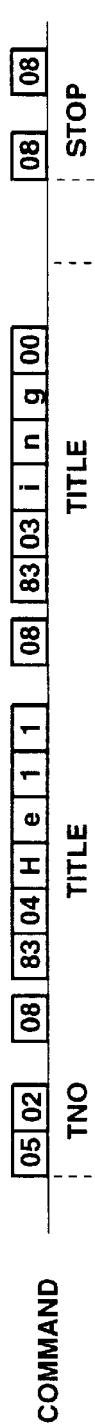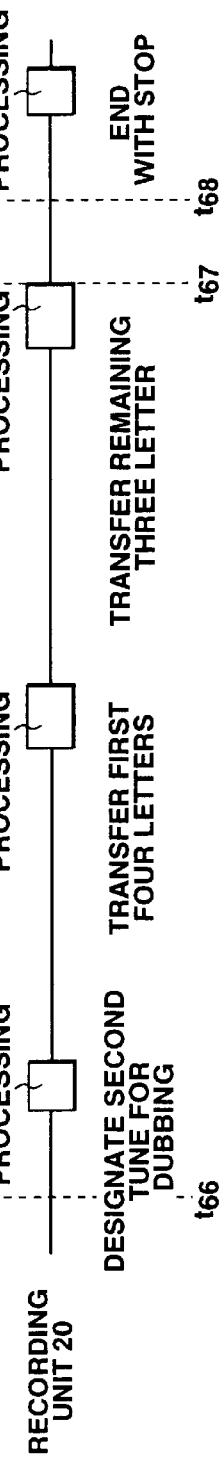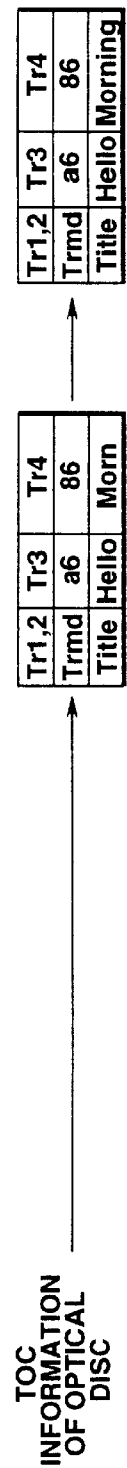

| TNO | TITLE | TRMD | TRACKSIZE |
|-----|---------|------|------------|
| Tr1 | EMOTION | e6 | 0011.05.02 |
| Tr2 | DREAM | e6 | 0022.1f.0a |
| Tr3 | HELLO | a6 | 0010.2f.0a |
| Tr4 | MORNING | 86 | 0020.1e.00 |

FIG.19

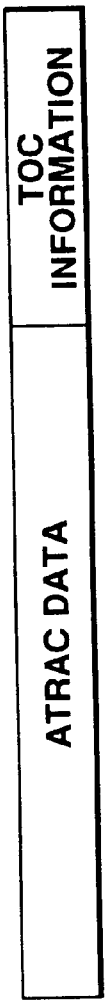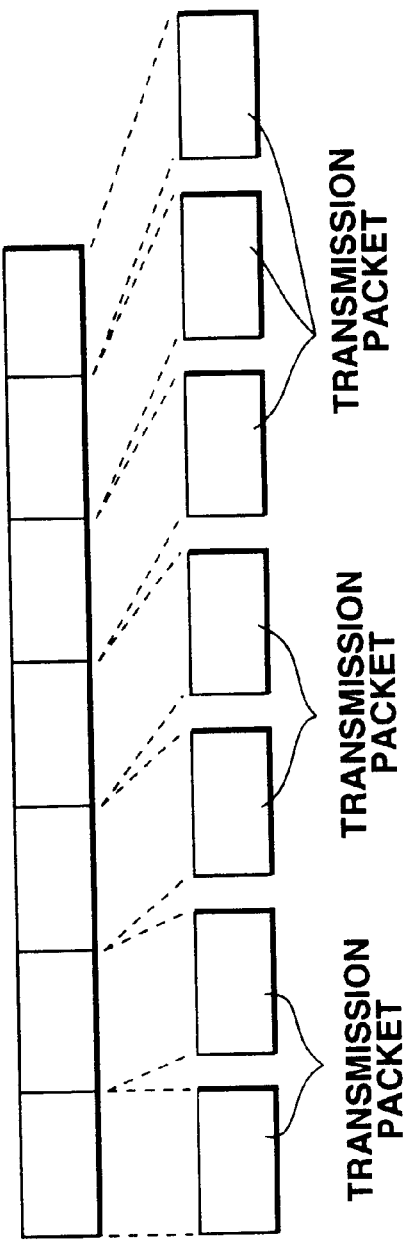

SYSTEM AND METHOD FOR RECORDING A COMPRESSED AUDIO PROGRAM DISTRIBUTED FROM AN INFORMATION CENTER

BACKGROUND OF THE INVENTION

1. Field of the Invention

This invention relates to a method and apparatus for recording compressed audio data transmitted over a transmission medium. More particularly, it relates to a method and apparatus for recording audio data on a recording medium, in which the recorded audio data can be randomly accessed using TOC information.

2. Related Art

There has so far been known a magneto-optical disc, known as a mini-disc (trade mark) which is a disc-shaped recording medium approximately 64 mm in diameter held in a cartridge for recording/reproducing audio data. This magneto-optical disc can record stereo audio data continuing for approximately 74 minutes using an Adaptive Transform Acoustic Coding (ATRAC) system for audio as an audio compression system. Since the magneto-optical disc is small-sized and excellent in portability, it can be taken outdoors easily. Moreover, in contradistinction from the conventional so-called compact disc (trade mark), the mini-disc; can record data so, it can be used for duplicating audio data.

Similarly to the conventional digital audio disc, the magneto-optical disc can randomly access recorded audio data, because the magneto-optical disc has not only an area for recording audio data but also a Table-Of-Contents area (TOC area) to control the recorded audio data. Therefore, in overwriting audio data on the magneto-optical disc having recorded audio data, musical numbers can be erased or edited by re-writing the TOC information without the necessity of re-writing the music data itself.

In transmitting compressed audio data over transmission channels, such as satellite broadcasting or public networks, it may be envisaged for a reception apparatus side to record compressed audio data transmitted from a transmitting apparatus side without expanding the data.

The recording medium loaded for this audio dubbing system is not necessarily an initialized disc ('virgin' disc) but may be a partially recorded disc. In the case of an audio dubbing system in which, before starting dubbing, the residual recording capacity of the recording medium loaded on the side of the reception apparatus is previously transmitted to a transmission apparatus which then receives the compressed audio data, an inconvenience arises that the confirmation operation needs to be carried out bidirectionally.

Since the confirmation operation is required before starting dubbing, there elapses time before starting the data distribution operation.

It may be contemplated to transmit the control information after distributing a series of compressed audio data. However, if the compressed audio data of a sum total of three musical numbers, each continuing for five minutes, with the total time being 15 minutes, and the residual recording capacity of the recording medium is 10 minutes, it is only after transmission of the compressed audio data and the control information completely comes to a close that the reception apparatus side can comprehend that the 5-minute portion of the transmitted data cannot be recorded on the recording medium.

Stated differently, it is after lapse of 15 minutes after start of dubbing that it is comprehended that the third musical number as the last musical number cannot be recorded.

In addition, since the control information is transmitted after completion of transmission of audio data, the title name or the relevant picture information of compressed audio data being recorded on the recording medium cannot be displayed during recording.

SUMMARY OF THE INVENTION

It is an object of the present invention to provide an distribution system, an distribution method and a reception method and apparatus whereby compressed audio data and the relevant information of the compressed audio data, such as data size data, picture information or text information, are packeted and transmitted or received by time divisional multiplexing from one packet to another.

In one aspect, the present invention provides a distribution system including blocking means for blocking a compressed audio program distributed from an information center and the relevant information concerning the distributed audio program, transmitting means for transmitting compressed audio program and the relevant information blocked by said blocking means by time division multiplexing, reception means for receiving the compressed audio program and the relevant information transmitted from said transmitting means by time division multiplexing, separation means for separating the audio program and the relevant information received by said reception means from each other, recording means for recording the compressed audio program separated by said separation means on a recording medium and advising means for advising a user of the relevant information separated by said separation means.

In another aspect, the present invention provides an distribution method including blocking a compressed audio program distributed from an information center and the relevant information concerning distributed audio program, transmitting the compressed audio program and the relevant information blocked by said blocking means by time division multiplexing, receiving the compressed audio program and the relevant information transmitted from said transmitting means by time division multiplexing, separating the audio program and the relevant information received by said reception means from each other, recording the compressed audio program separated by said separation means on a recording medium and advising a user of the relevant information separated by said separation means.

In still another aspect, the present invention provides a transfer/reception system for transferring at least one compressed audio program and receiving the transferred compressed audio program, the transferring system including generating means for generating capacity size information corresponding to the compressed audio program, transferring means for transferring the compressed audio program and the capacity size information corresponding to the compressed audio program, and the receiving system including receiving means for receiving the compressed audio program and capacity size information corresponding to the compressed audio program, generating means for generating the management information in accordance with the capacity size information corresponding to the compressed audio program, recording means for recording the compressed audio program and the management information in the recordable area and in the management area of the recording medium, respectively, whereby the transferred compressed audio program is divided into plural compressed audio programs in accordance with the capacity size information.

In yet another aspect, the present invention provides a transferring/receiving method for transferring at least one compressed audio program and receiving the transferred compressed audio program, including generating capacity size information corresponding to the compressed audio program, transferring the compressed audio program and the capacity size information corresponding to the compressed audio program, receiving the transferred compressed audio program and the capacity size information corresponding to the compressed audio program, generating the management information in accordance with the capacity size information corresponding to the compressed audio program and recording the compressed audio program and the management information in the recordable area and in the management area of the recording medium, respectively, whereby the transferred audio program is divided into plural compressed audio programs in accordance with the capacity size information.

According to the present invention, the compressed audio program distributed from the information center and the relevant information concerning the distributed audio program are blocked and transmitted by time division multiplexing, so that, if the reception side apparatus receiving the compressed audio program decodes the relevant information, it is possible to display the title name of the received audio program, pictures or photos of a producer or introductory columns of the contents producer.

In addition, recording can be started promptly without advising the transmitting side prior to start of recording of the recordable residual amount of the recording medium loaded on the reception side.

Moreover, since the reception side can comprehend the capacity of the compressed audio program being recorded, on decoding the relevant information concerning the distributed audio program, as a result of transmission of the sequentially compressed audio program and the relevant information, it is possible to issue an alarm concerning the shortage of the recordable residual amount promptly by comparing the residual amount of the recording medium and the recording capacity of the received compressed audio program prior to recording.

BRIEF DESCRIPTION OF THE DRAWINGS

FIG. 4 shows the data structure for a U-TOC sector 0 which is a management area on a magneto-optical disc embodying the present invention.

FIG. 8 shows a data structure for a U-TOC sector 1 which is a management area on a magneto-optical disc embodying the present invention.

FIG. 9 shows a data structure for a U-TOC sector 2 which is a management area on a magneto-optical disc embodying the present invention.

FIG. 10 shows a data structure for a U-TOC sector 4 which is a management area on a magneto-optical disc embodying the present invention.

FIG. 12A is a block diagram showing the connecting state between an audio transferring unit 10 and a recording unit 20 according to the present invention.

FIG. 12B is a timing chart for illustrating compressed audio data ATRAC sent from the audio transferring unit 10 to the recording unit 20, a request signal Data Req sent from the recording unit 20 to the audio transferring unit 10 and the processing timing on the recording unit.

FIG. 12C is a timing chart for illustrating a command signal Command sent from the audio transferring unit 10 to the recording unit 20, an acknowledgment signal ACK sent from the recording unit 20 to the audio transferring unit 10 and the processing timing on the recording unit.

FIG. 15A is a timing chart for compressed audio data ATRAC sent from the audio transferring unit 10 to the recording unit 20.

FIG. 15B is a timing chart of a request signal DATA Req sent from the recording unit 20 to the audio transferring unit 10.

FIG. 15C is a timing chart for illustrating a command signal Command sent from the audio transferring unit 10 to the recording unit 20.

FIG. 15D is a timing chart for illustrating an acknowledgment signal ACK sent from the recording unit 20 to the audio transferring unit 10.

FIG. 15E is a timing chart for illustrating the timing of processing on the recording unit.

FIG. 16A is a timing chart for illustrating a command signal Command sent from the audio transferring unit 10 to the recording unit 20.

FIG. 16B is a timing chart for illustrating an acknowledgment signal ACK sent from the recording unit 20 to the audio transferring unit 10.

FIG. 16C is a timing chart for illustrating the timing of processing on the recording unit.

FIG. 16D is a diagrammatic view showing the contents of the management information TOC formed on the optical disc D.

FIG. 17A is a timing chart for illustrating a command signal Command sent from the audio transferring unit 10 to the recording unit 20.

FIG. 17B is a timing chart for illustrating an acknowledgment signal ACK sent from the recording unit 20 to the audio transferring unit 10.

FIG. 17C is a timing chart for illustrating the timing of processing on the recording unit.

FIG. 17D is a diagrammatic view showing the contents-of the management information TOC formed on the optical disc D.

FIG. 18A is a timing chart for illustrating a command signal Command sent from the audio transferring unit 10 to the recording unit 20.

FIG. 18B is a timing chart for illustrating an acknowledgment signal ACK sent from the recording unit 20 to the audio transferring unit 10.

FIG. 18C is a timing chart for illustrating the timing of processing on the recording unit.

FIG. 18D is a diagrammatic view showing the contents of the management information TOC formed on the optical disc FIG. 19 illustrates the contents recorded on the optical disc D.

FIG. 21A is a data structure diagram showing an example of sequentially transmitting the compressed audio data and the TOC data.

FIG. 21B is a data structure diagram showing the compressed audio data shown in FIG. 21A in further detail.

FIG. 21C is a data structure diagram in case the compressed audio data and the TOC data are divided into and sent as packets of pre-set lengths.

DESCRIPTION OF PREFERRED EMBODIMENTS

Figure 1:
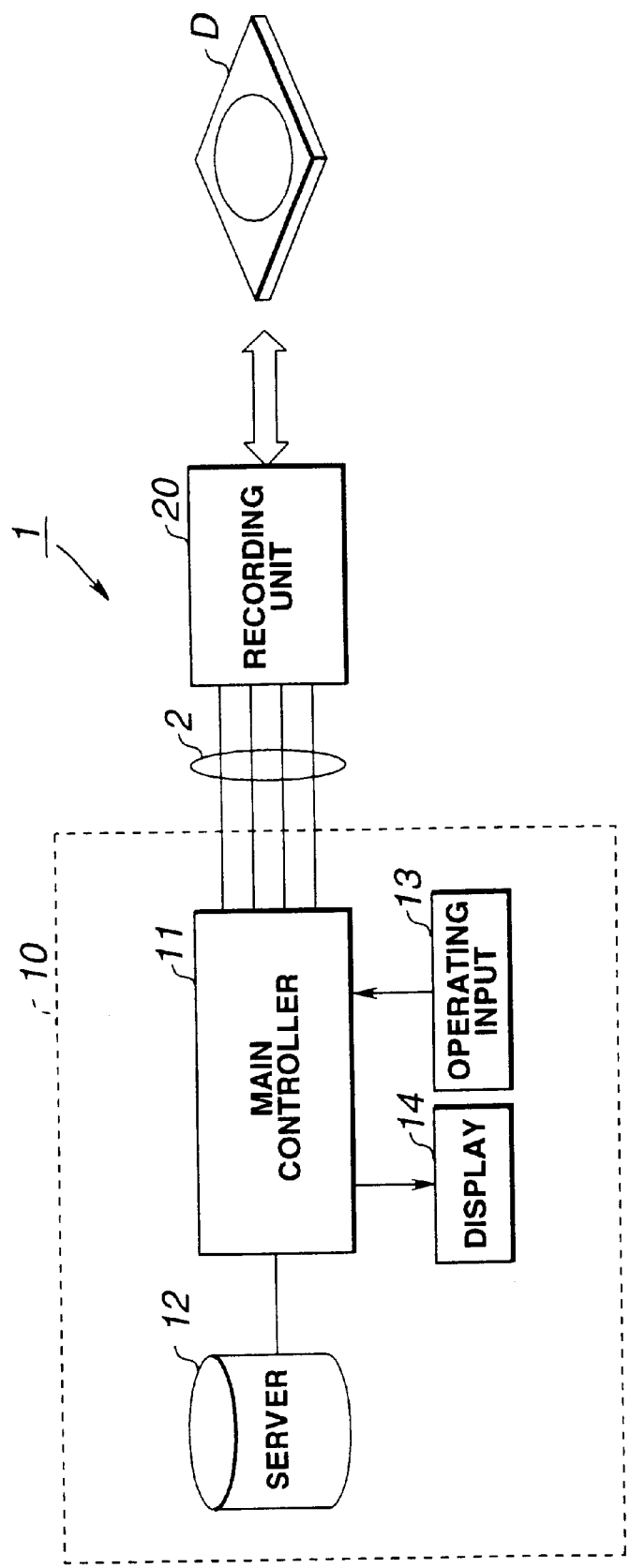
FIG. 1 is a block diagram of the overall dubbing system embodying the present invention.
Figure 2:
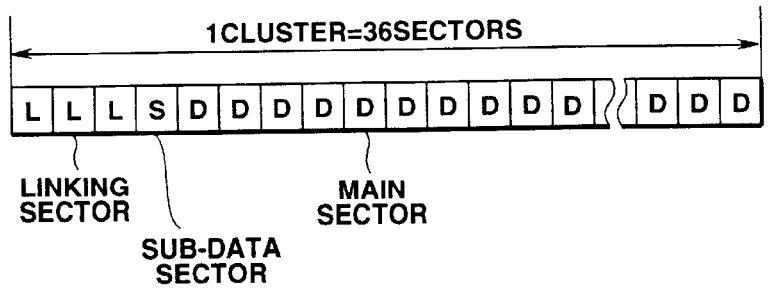
FIG. 2 shows the data structure on a magneto-optical disc embodying the present invention.

Referring to the drawings, preferred embodiments of an audio dubbing system according to the present invention will be explained in detail.

FIG. 1 shows an audio dubbing system embodying the present invention. An audio dubbing system 1 has an audio transfer unit 10 including a main controller 11, a server 12, an actuating input unit 13 and a display unit 14, a recording unit 20 for recording audio data on a portable recording medium and a connection cable 2 for interconnecting the audio transfer unit 10 and the recording unit 20.

In this audio dubbing system 1, audio data is previously stored in a server 12 of the audio transfer unit 10, so that the user will select desired audio data from the audio data stored in the server 12 for recording on a recording medium.

That is, the present audio dubbing system 1 is such a system purveying musical contents to the user by recording audio data on a recording medium owned by the user, instead of purveying contents of audio data stored in a medium such as compact disc or audio tape. For example, this audio dubbing system 1 can be installed on a railroad station or a retail store to furnish the chargeable musical contents to the user or on a music studio for contents management purposes.

The schematics of the contents purveying system of the present audio dubbing system 1 are hereinafter explained.

In the server 12 of the audio dubbing system 1, musical contents of musical numbers, each continuing for several minutes, such as top 100 numbers of the latest chart hits, are stored as audio data. The user confirms the contents purveyed by the audio dubbing system 1 by a display 14 and, if he or she finds desired contents, he or she selects one or plural contents using the actuating input unit 13. The user loads the recording medium D in the recording unit 20 and actuates the actuating input unit 13 to initiate the recording.

If the user initiates the recording operation, the main controller 11 of the audio transfer unit 10 furnishes audio data of the contents designated by the user, from among the contents stored in the server 12, to the recording unit 20. The recording unit 20 records the audio data furnished from the audio transfer unit 10 in a recordable area of the recording medium.

When the recording of audio data of the contents desired by the user comes to a close, the audio dubbing system 1 completes the purveying of the contents.

In the following description of the present audio dubbing system 1, it is assumed that the recording medium handled by the audio dubbing system 1 of the present embodiment is a magneto-optical disc which is a recordable and reproducible disc provided in the format termed a mini-disc (trade mark).

This magneto-optical disc, termed the mini-disc, is a disc-shaped recording medium approximately 64 mm in diameter, held in a cartridge, and can record approximately 74 minutes of stereo audio data using a adaptive transform acoustic coding (ATRAC) system. This magneto-optical disc, termed the so-called mini-disc, is herein referred to simply as an optical disc D.

Since the audio dubbing system 1 records the audio data compressed in accordance with the ATRAC system on the optical disc D, audio data of the contents stored in the server 12 are previously compressed in accordance with the ATRAC system. The audio data, compressed in accordance with the ATRAC system, is directly recorded on the optical disc D, without processing the audio data with decoding or encoding. The audio data compressed by the ATRAC system is referred to herein as ATRAC data. Thus, a connection cable 2 used for transferring audio data from the audio transfer unit 10 to the recording unit 20 transfers the ATRAC data. It is noted that control commands or command data (Command) such as table-of-contents (TOC) data of the optical disc D are sent over the connection cable 2 in accordance with the transmission protocol which will be explained subsequently.

In FIG. 1, the server 12 is provided in the audio transfer unit 10. It is however possible to provide the server 12 in an information center provided in, for example, a remote place, and to provide the main controller 11, display 14, actuating input unit 13 and the recording unit 20 in the same casing in order to communicate with the remote server 12 over ISDN or a telephone network.

The format of data of the optical disc D used in the audio dubbing system 1 will now be explained.

Data recorded on the optical disc D is managed in terms of a cluster as a unit. The data can be written on the optical disc D in units corresponding to an integer number times of a cluster. It is noted that an audio signal of approximately 2.04 second is produced on reproducing the ATRAC data recorded in each cluster.

It is noted that each cluster is made up of 3 linking sectors, 1 sub-data sector and 32 main sectors. The main sector is a unit made up of 2352 byte data. It is noted that audio data compressed by ATRAC is recorded in a program area which will be explained subsequently.

Since the format of the optical disc D uses an error correction system of the advanced cross interleaving Reed Solomon code (ACIRC) system, the linking sector is used as a sector allocated for completing the error-correcting interleaving within the cluster. That is, the linking sector is a waste sector for taking into account the interleaving in the error correction so that the data rewriting will be made on the cluster basis.

The sub-data sector is a reserve area.

The optical disc D handles 424 byte data compressed in accordance with the ATRAC system in units termed a sound group. This sound group allocates 212 byte data for each of the left and right channels. This sound group allocates 212 byte data for each of the left and right channels. On expansion, the sound-group-based compressed data corresponds to 512 samples of left and right channels. These 512 samples of data correspond to 2048 byte data, more specifically, 512 samples×16 bits×2 channels÷8 bits=2048 bytes.

Figure 3:
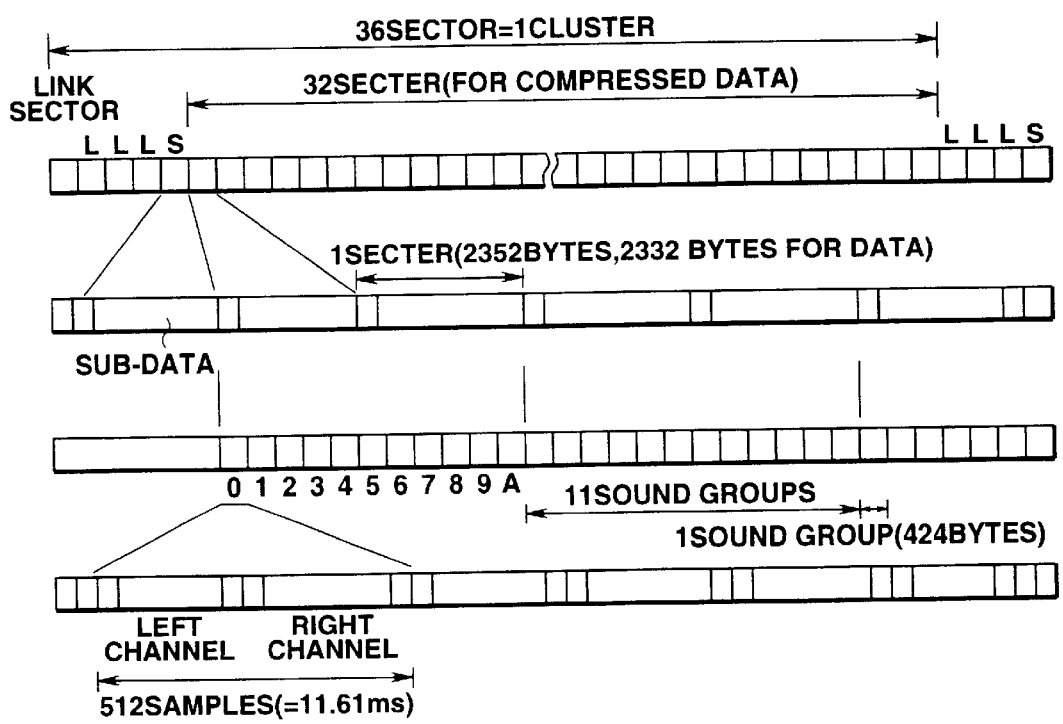
FIG. 3 similarly shows the data structure on a magneto-optical disc embodying the present invention.

Eleven (11) of the sound groups make up two sectors, as shown in FIG. 3.

The recording area of the optical disc D is split into a program area for recording audio data compressed in accordance with the ATRAC system, a user table-of-contents (U-TOC) area as a management area for recording management data for managing audio data recorded in the program area, and a pre-mastered table-of-contents (P-TOC) area as a lead-in area.

In this optical disc D, musical numbers can be erased or edited by rewriting the U-TOC information instead of physically erasing the actual music data for rewriting. For example, in the case of the optical disc D having recorded thereon five musical numbers, if a start address and an end address of a third musical number are erased, the third musical number cannot be reproduced. Thus, when recording the ATRAC data on the optical disc D, this U-TOC information needs to be re-written simultaneously. This U-TOC is explained hereinbelow. The unit of audio data recorded on the optical disc D is simply termed 'track'. This track is the unit of a musical number corresponding to the contents of the music purveyed by the above-described audio dubbing system 1.

The U-TOC of the optical disc D is made up of from U-TOC sector 0 to U-TOC sector 15, totalling sixteen (16) sectors. The U-TOC sector n, where n denotes 1 to 15, is indicated simply as U-TOCn.

FIG. 4 shows data recorded on the U-TOC0. The data recorded on the U-TOC0 is partitioned into bytes and represented as a slot for convenience. Each slot is specified by numerical figures from 0 to 587 on the ordinate in FIG. 4 by slot number of from 1 to 4 on the abscissa. The same applies for the U-TOC1 and so forth.

In the U-TOC0, there are recorded twelve (12) byte header data followed by ClusterH and ClusterR specifying the address of the TOC0. In the TOC0, there are recorded a Maker code, specifying the maker of the optical disc D, FirstTNO specifying the track number of the first track of the optical disc D and LastTNO specifying the track number of the last track, beginning from a slot 7×1. In the U-TOC0, Used Sectors specifying the use state of the sectors and DiscSerialNo specifying the serial number of the optical disc D are recorded in slot 8×4 and in slot 10×4, respectively.

In the U-TOC0, there are also recorded DiscID specifying the ID number of the optical disc D, a pointer P-DFA (Pointer for Defective Area) specifying the slot having recorded therein the start address of an area for recording the defective address information produced on the optical disc D, a pointer P-EMPTY (Pointer for Empty Slot) specifying the use state of a slot and a pointer P-FRA (Pointer for free Area) specifying a slot having recorded therein the start address of an area used for managing the recordable area, beginning from a slot 11×1. In the U-TOC0, there is also recorded a pointer P-TNOn specifying the slot having recorded therein a start address of each track recorded on the optical disc D from a slot 12×2 to a slot 75×4, n specifying the track number of each track. Since 255 tracks can be provided on the optical disc D, n is an integer from 1 to 255.

In the U-TOC0, there are also recorded a start address and an end address of each track, link information Link-P and a track mode (Trackmode) from a slot 78×1 to a slot 587×4. In the U-TOC0, there are further recorded 255×4 slots for recording the start address and the end address. The start and end addresses are recorded in a slot associated with each track.

Therefore, the pointer recorded in each of the abovementioned P-DFA, P-EMPTY and in P-FRA indicate a slot of a start address represented from the slot 78×1.

Figure 5:
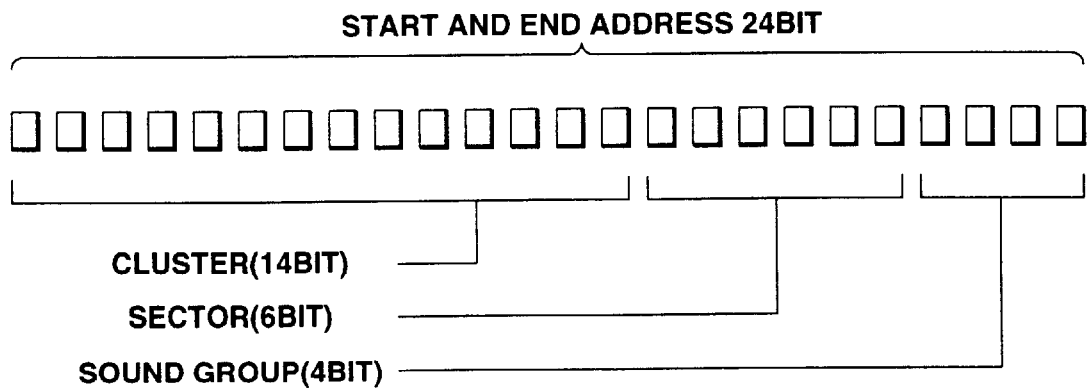
FIG. 5 shows the data structure of a slot on a U-TOC which is a management area on a magneto-optical disc embodying the present invention.

The above-mentioned start and end addresses are represented in 3 bytes=24 bits, as shown in FIG. 5. In the start and end addresses, a cluster address, a sector address and an address of the sound group are recorded in the first fourteen (14) bits, next six (6) bits and the trailing four (4) bits, respectively.

Figure 6:
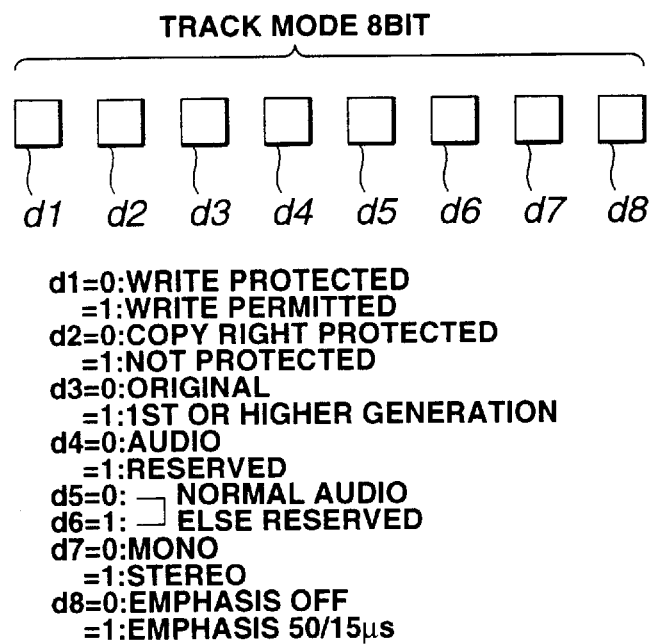
FIG. 6 shows the data structure of a track mode on a U-TOC which is a management area on a magneto-optical disc embodying the present invention.

The track mode (Trackmode) is represented by 1 byte=8 bit data, as shown in FIG. 6. In the track mode (Trackmode), the recording protect information, duplication protect information, generation information, audio information, erasure reserve information, monaural or stereo information and the emphasis information are recorded in the first bit, second bit, third bit, fourth bit, fifth and sixth bits, seventh bit and in the eighth bit, respectively. That is, the relevant information proper to each track is recorded in the track mode (Trackmode).

The link information P-Link is a pointer used for tracing from which start address the next data is recorded in case the same track is not recorded as a continuous data stream on the optical disc D, that is in case data of the same track is recorded discretely in the recording area of the optical disc. For example, if, in reproducing a track, data from the start address of the slot 586×1 needs to be reproduced next to the end address represented in the slot 78×1, the link information Link-P of the slot 80×4 specifies the slot 581×1.

That is, in the optical disc D, data need not necessarily be recorded continuously on the recording medium, that is as a continuous data stream, but a sequential data string may be recorded discretely. If data is recorded discretely, data continuity is indicated by this link information P-Link, such that, by transiently storing read-out data in a memory during reproduction and by writing data in the memory at a quicker rate than the data read-out rate, continuous data can be reproduced without interruptions.

If data shorter than the recorded program is overwritten on the previously recorded data, efficient recording can be achieved by specifying the redundant area as a recordable area (P-FRA) without erasing the redundant area.

Figure 7:
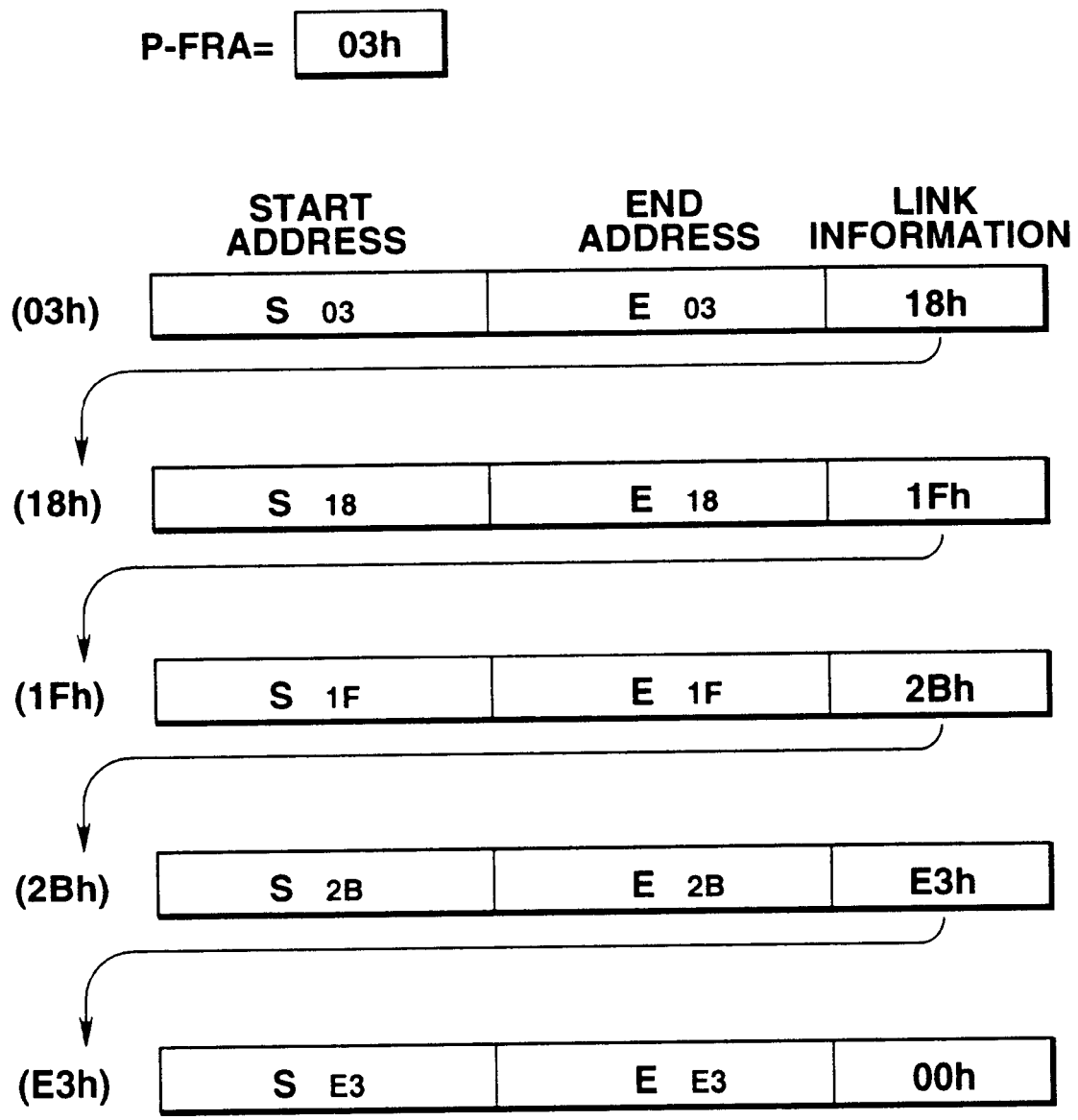
FIG. 7 is a diagrammatic view showing the linking state of each slot on a U-TOC which is a management area on a magneto-optical disc embodying the present invention.

The method for linking discrete areas is now explained with reference to FIG. 7 taking an example of the recordable area P-FRA.

If 03h (hexadecimal) is recorded in P-FRA specifying the leading end position of the slot managing the recordable area of U-TOC0, the slot associated with 03h is first accessed.

The start and end address recorded in the slot 03h specify a start point address and an end point address of a fractional portion in a track recorded on the disc.

The link information recorded in the slot 03h specifies the slot number of the next following slot and is herein 18h.

Next, by tracing the link information recorded in the slot 18h, the slot 2Bh is accessed. Then, the link information recorded in the slot 2Bh is traced to access the slot E3h. By tracing the link information as described above, the link information is traced until 00h data appears as the link information.

By tracing the slots beginning from a slot specified by P-FRA until the link information is equal to Null (=00h), it is possible to link on the memory plural fractional parts making up a track discretely recorded on the disc.

An area specified by a starting point address and an end point address of a slot 18h specified by the link information of the slot 03h can be judged to be a recordable area. In addition, if the slot 1Fh described in the link information of the slot 18h is traced, an area specified by a starting point address and an end point address of the slot 1Fh can be judged to be a recordable area.

If a slot 2Bh specified in the link information of the slot 1Fh is traced, an area specified by a starting point address and an end point address of the slot 1Fh can be judged to be a recordable area. By tracing the slot addresses recorded in the link information as described above, the slots are traced until the link information is equal to 00h.

Although P-FRA is taken as an example for explanation, discretely present fractional parts can similarly linked for P-DFA, P-EMPTY and T-TNO0 to 255.

FIG. 8 shows data recorded on the U-TOC1.

In the U-TOC1, the title of each track and title of the optical disc D in its entirety are managed.

If the recording track is audio data, the title of the optical disc D in its entirety and the title of each track correspond to the album title and the name of the performer and to the name of the musical number, respectively.

The letter information for each track is recorded in the slot specified by P-TNAn, where n is 1 to 255. If there are a large number of letters, the link information is used to connect plural slots for recording.

FIG. 9 shows data recorded on the U-TOC2.

In U-TOC2, the recording time and data for each program recorded in the program area is managed in the similar configuration to the above-mentioned U-TOC0.

FIG. 10 shows data recorded in the U-TOC4.

In U-TOC4, the title of each program recorded in the program area is managed in the similar configuration to the above-mentioned U-TOC0 so that the Japanese syllabic characters and kanji can be used as fonts of the entire title of the entire optical disc D.

Figure 11:
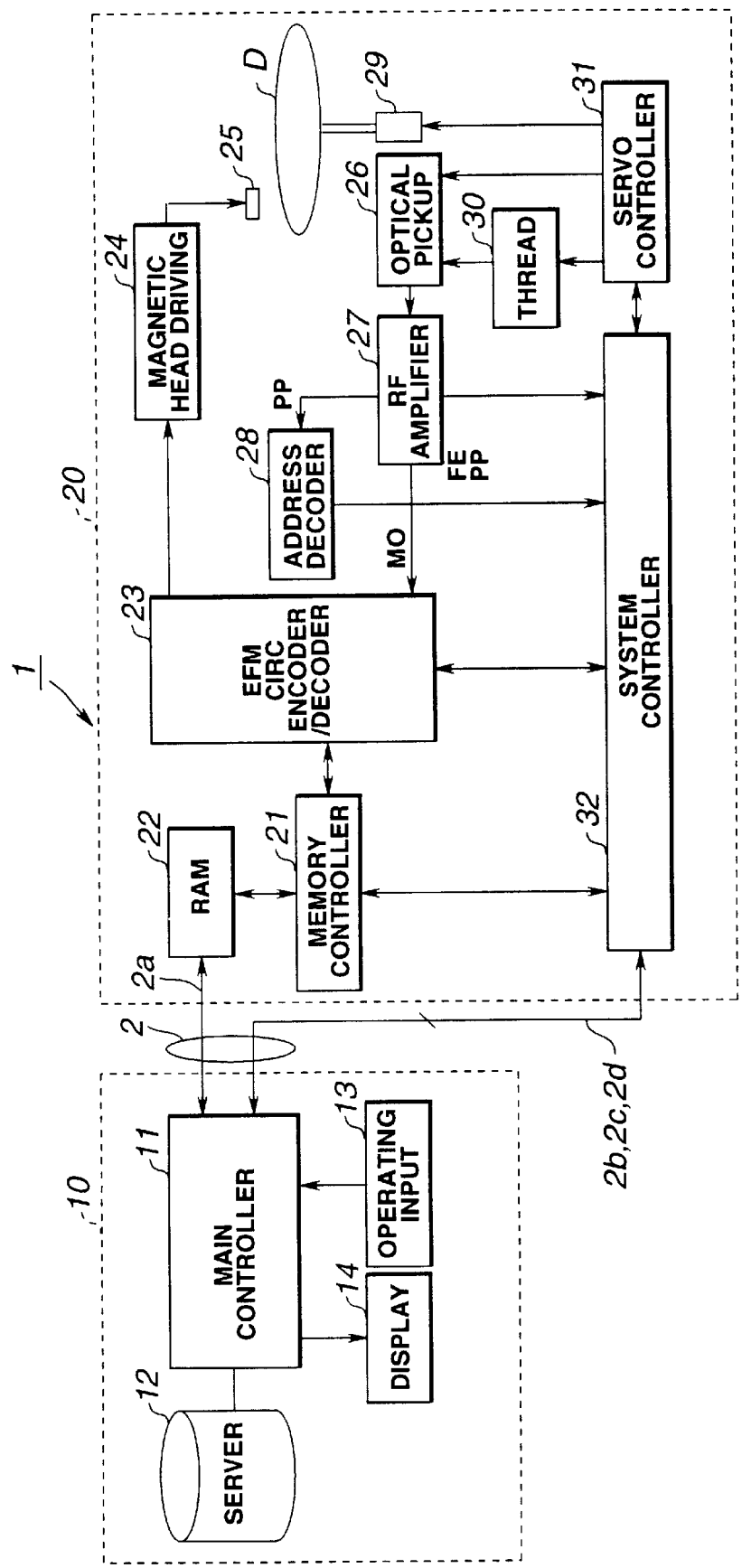
FIG. 11 is a detailed block diagram of a recording device shown in FIG. 1.

Referring to FIG. 11, the configuration of the audio dubbing system 1, added to with that of the recording unit 20 as described above, will be explained in detail.

FIG. 11 shows the block diagram of the audio dubbing system 1 embodying the present invention. This audio dubbing system 1 is made up of an audio transfer unit 10, a recording unit 20 and a connection cable 2 interconnecting the audio dubbing system 1 and the recording unit 20. The audio transfer unit 10 has a main controller 11, a server 12, actuating input unit 13 and a display unit 14. The recording unit 20 is used for recording audio data in a portable type recording medium.

The recording unit 20 includes a random-access memory (RAM) 22 for storing data sent from the audio transfer unit 10, and a memory controller 21 for controlling the RAM 22. The recording unit 20 also includes an encoding/decoding circuit 23 for decoding and encoding data and a magnetic head driving circuit 24 for driving a magnetic head 25 and an optical pickup 26 for illuminating the laser light on the optical disc D for detecting the reflected light. The recording unit 20 also includes a RF amplifier 27 for reproducing the focussing error signals (FE), push-pull signals (PP) and photomagnetic playback signals (MO) from the reflected light detected from the optical pickup 26. The recording unit 20 also includes an address decoder 28 for reproducing signals corresponding to the wobbling of the groove formed in the guide groove of the optical disc D based on the push-pull signal PP from the RF amplifier 27 for decoding the ADIP and a spindle motor 29 for rotationally driving the optical disc D. The recording unit 20 further includes a thread unit 30 for radially moving the optical pickup 26 along the radius of the optical disc D.

The recording unit 20 includes a servo circuit 31 for controlling the focussing servo, thread servo and spindle servo based on the focussing error signals (FE) and the push-pull signals (PP) and a system controller 32 for controlling the memory controller 21, encoding/decoding circuit 23 and the servo circuit 31.

The optical pickup 26 illuminates the laser light on the optical disc D from the laser diode via an objective lens. The optical pickup 26 also detects the reflected light from the optical disc D by a photodetector to send the detection current to the RF amplifier 27.

The RF amplifier 27 generates the focussing error signals (FE), push-pull signals (PP) and the photomagnetic playback signals (MO) based on the detection current from the photodetector. The RF amplifier 27 sends the generated focussing error signals (FE) to the servo circuit 31, while sending the push-pull signal (PP) to the address decoder 28 and the servo circuit 31, while sending the photomagnetic playback signals (MO) to the encoding/decoding circuit 23.

The servo circuit 31 drives the objective lens via a biaxial unit of the optical pickup 26, based on the furnished focussing error signals (FE) and the push-pull signals (PP), in order to perform tracking and focussing servo control of the light beam radiated to the optical disc D. The servo circuit 31 drives a thread unit 30 based on the push-pull signal (PP) to perform thread servo control for driving the optical pickup 26 radially of the optical disc D. The servo circuit 31 performs spindle servo control of driving the spindle motor 29 to cause the optical disc D to be rotated at a constant linear velocity (CLV) based on the spindle error signals from an optical disc rotation detection circuit, not shown.

The address decoder 28 regenerates the address information from the wobbled signals corresponding to the groove wobbling formed in the guide groove of the optical disc D.

The encoding/decoding circuit 23 converts the photomagnetic playback signals (MO) from the RF amplifier 27 into bi-level signals and decodes the bi-level signals in accordance with the eight-to-fourteen modulation (EFM) system while also decoding error correction in accordance with the cross-interleaved Reed-Solomon coding (CIRC). The encoding/decoding circuit 23 appends error correction codes to the recording signals supplied from the memory controller 21 in accordance with the CIRC system and modulates the resulting signal in accordance with the EFM system to send the recording signal to the magnetic head driving circuit 24.

The magnetic head driving circuit 24 drives the magnetic head 25 based on recording signals from the encoding/decoding circuit 23 to apply a modulating magnetic field on the optical disc D by way of recording the recording signals.

The memory controller 21 controls the writing and read-out of the ATRAC data to be stored on the RAM 22. This memory controller 21 causes the ATRAC data supplied from the audio transfer unit 10 transiently in the RAM 22 to send the transiently stored data subsequently to the encoding/decoding circuit 23.

The system controller 32 performs control of the recording unit 20 in its entirety. For example, the system controller 32 controls the memory controller 21, encoding/decoding circuit 23 and the servo circuit 31. The system controller 32 also controls the circuits adapted for exchanging control data with the audio transfer unit 10, as will be explained subsequently.

By the above structure, the recording unit 20 of the audio dubbing system records ATRAC data sent from the audio transfer unit 10 on the optical disc D.

The data transfer method between the audio transfer unit 10 and the recording unit 20 of the audio dubbing system 1 will now be explained with reference to FIG. 12.

The audio dubbing system 1 has the connection cable 2 interconnecting the audio transfer unit 10 and the recording unit 20. The connection cable 2 is made up of an ATRAC line 2a for sending the ATRAC data as compressed audio data sent from the audio transfer unit 10 to the recording unit 20 and a Data Rec line 2b for sending the ATRAC data request signal (Data Req) sent from the recording unit 20 to the audio transfer unit 10.

The ATRAC data corresponding to the contents stored in the server 12 are sent over the ATRAC line 2a from the main controller 11 of the audio transfer unit 10 to the memory controller 21 of the recording unit 20. Also, an ATRAC data request signal (Data Req) specifying a request of the ATRAC data is sent from the system controller 32 of the recording unit 20 over the Data Req line 2b to the main controller 11 of the audio transfer unit 10. That is, since the ATRAC data is transferred in terms of a pre-set volume as a unit, the recording unit 20 sends this request signal (Data Req) to the audio transfer unit 10 to make a request for the next data if all of the ATRAC data already transferred and written into he RAM 22 have been written in their entirety on the optical disc D.

Specifically, the time chart of FIG. 12b shows the relation between the ATRAC data and the request signal (Data Req).

If the recording state of the recording unit 20 is regular, the recording unit 20 sends the request signal (Data Req) at time t11 to the audio transfer unit 10. When fed with the request signal (Data req), the audio transfer unit 10 starts to supply the ATRAC data of a pre-set amount to the recording unit 20 at time t12. When fed with the ATRAC data, the recording unit 20 halts the supply of the request signal (Data Req) at time t13.

Also, if the recording state of the recording unit 20 is not regular, no request signal (Data Req) is sent from the recording unit 20 to the audio transfer unit 10, as indicated at time t14 to t15, so that no ATRAC data is transferred from the audio transfer unit 10 to the recording unit 20. If the request signal (Data Req) is not sent from the recording unit 20 for a pre-set time on end, the audio transfer unit 10 discontinues the recording operation.

If the request signal (Data Req) is sent as indicated from time t15 until time t16, but the ATRAC data is not sent for a pre-set time from the audio transfer unit 10, the recording unit 20 sets the data writing standby state, for example, the recording paused state, in order to await the ATRAC data. If the ATRAC data is sent, the recording unit 20 initiates the writing operation as indicated as from time t17. If the writing standby state continues for a pre-set time on end, the audio dubbing system 1 judges that some trouble has occurred to discontinue the processing.

Thus, the audio dubbing system 1 can record ATRAC data reliably by the recording unit 20 issuing the ATRAC data request signal (Data Req) to the audio transfer unit 10.

The audio dubbing system 1 also has a command line COMMAND 2c for transferring the control command or other command data such as the TOC information supplied form the audio transfer unit 10 to the recording unit 20 and an ACK line 2d for transferring an acknowledgment signal (ACKNOWLEDGE) to the command data from the audio transfer unit 10 to the recording unit 20, as shown in FIG. 12a.

The TOC information generated by the main controller 11 of the audio transfer unit 10 or the command data such as data sizes of the ATRAC data of various contents are sent over the command line 2c to the system controller 32 of the recording unit 20. If the recording unit 20 has terminated the processing relevant to the command data, the acknowledgment signal (ACKNOWLEDGE) is sent over the ACK line 2d from the system controller 32 of the recording unit 20 to the main controller 11 of the audio transfer unit 10.

Specifically, the relation between the command data and the acknowledgment signal (ACKNOWLEDGE) is shown in the timing chart of FIG. 12c.

First, the audio transfer unit 10 sends pre-set command data at time t21 to the recording unit 20. When the supply of the command data comes to a close, the recording unit 20 performs processing relevant to the supplied command data at time t22. When the processing relevant to the supplied command data comes to a close, the recording unit 20 sends a reset command at time t23 to the recording unit 20. On reception of the reset command, the recording unit 20 terminates the supply of the acknowledgment signal (ACKNOWLEDGE) at time t24. If the command data has been supplied, the recording unit 20 halts the supply of the acknowledge (ACKNOWLEDGE) at time t25. If the command data has been supplied but the acknowledgment signal (ACKNOWLEDGE) is not supplied for a pre-set time from the recording unit 20, the audio transfer unit 10 deems that some trouble has occurred and accordingly interrupts the processing.

The following Table 1 shows command data supplied from the audio transfer unit 10 to the recording unit 20 over the COMMAND line 2.

TABLE 1

| command name | data of command (1 byte) | function |
| --- | --- | --- |
| SETUP | 01 | set recording unit 20 to recording pause state |
| START | 02 | start recording |
| STOP | 03 | terminate processing |
| TOC0info | 04 | TOC0 information (track size and track mode) |
| TNO | 05 | designation of track number |
| ACK-RESET | 08 | ACK reset |
| ALRIGHT | 0b | recording state confirmed |
| Title | 83 | title information |

The setup command (SETUP) is a command for setting the recording unit 20 in the recording standby state, that is the recording pause state. On reception of the setup command (SETUP), the recording unit 20 is in the recording pause state. Specifically, this setup command (SETUP) is given as "01" data of 1 byte.

The start command (START) is a command specifying the recording start of the ATRAC data. On reception of the start command (START), the recording unit 20 initiates recording of the ATRAC data on the optical disc D. Specifically, this start command (START) is given as "02" data of 1 byte.

The stop command (STOP) is a command specifying the end of processing of the recording unit 20 relevant to the commands. On reception of the stop command (STOP), the recording unit 20 halts recording initiated by the start command (START). Specifically, this stop command (STOP) is given as "03" data of 1 byte.

The TOC0 information command (TOC0info) is a command specifying the information recorded in the U-TOC sector 0 of the optical disc D. On reception of the TOC0 information command (TOC0info) and the information on the track size and track mode next to the command, the recording unit 20 finds the recorded start and end addresses of the ATRAC data from the track size to record the TOC data in the U-TOC.

That is, the TOC0 information is inherently generated by the recording unit 20 itself so as to be recorded on the optical disc D. However, if ATRAC data of plural contents are supplied from the audio transfer unit 10, these data are sent as a continuous data stream to the recording unit 20, so that junction points between the contents cannot be distinguished and hence the track information cannot be generated. Therefore, the audio transfer unit 10 sends the track mode and the track size, indicating the data size specifying the data stream length of data corresponding to the respective contents, as the TOC0 information command (TOC0info). Based on the TOC0 information command (TOC0info), the recording unit 20 generates the TOC0 information to be recorded on the optical disc D.

Specifically, the track number TOC0 information command (TOC0info) is given as 1-byte "04" data.

The command (TNO) is a command specifying the track number of the ATRAC data to be recorded. On reception of the track number command (TNO) and the track number next following the command, the recording unit 20 performs processing for the next following title command (Title) on the track number. Specifically, the track number command (TNO) is given as 1-byte "05" data.

Th reset command (ACK-RESET) is a command for resetting the acknowledgment signal (ACKNOWLEDGE) supplied from the recording unit 20. When fed with the reset command (ACK-RESET), the recording unit 20 halts the supplying of the acknowledgment signal (ACKNOWLEDGE). Specifically, the reset command (ACK-RESET) is given as 1-byte "08" data.

The recording state confirming command (ALRIGHT) is a command for confirming the recording state of the recording unit 20. On reception of the recording state confirming command (ALRIGHT), the recording unit 20 sends the acknowledgment signal (ACKNOWLEDGE) to the audio transfer unit 10. Specifically, the recording state confirming command (ALRIGHT) is given as 1-byte "0b" data.

The title (Title) command is a command which furnishes the title information to be recorded in the TOC1 and TOC4 of the optical disc 4. Next to the title command (Title), the letter string information and character data are supplied. On reception of the letter string information and character data, the recording unit 20 records the title information for each track in TOC1 and TOC2 of the optical disc D. Specifically, the title command (Title) is give as as 1-byte "83" data.

The processing contents of the audio dubbing system 1 are explained with reference to a flowchart shown in FIG. 13.

Figure 13:
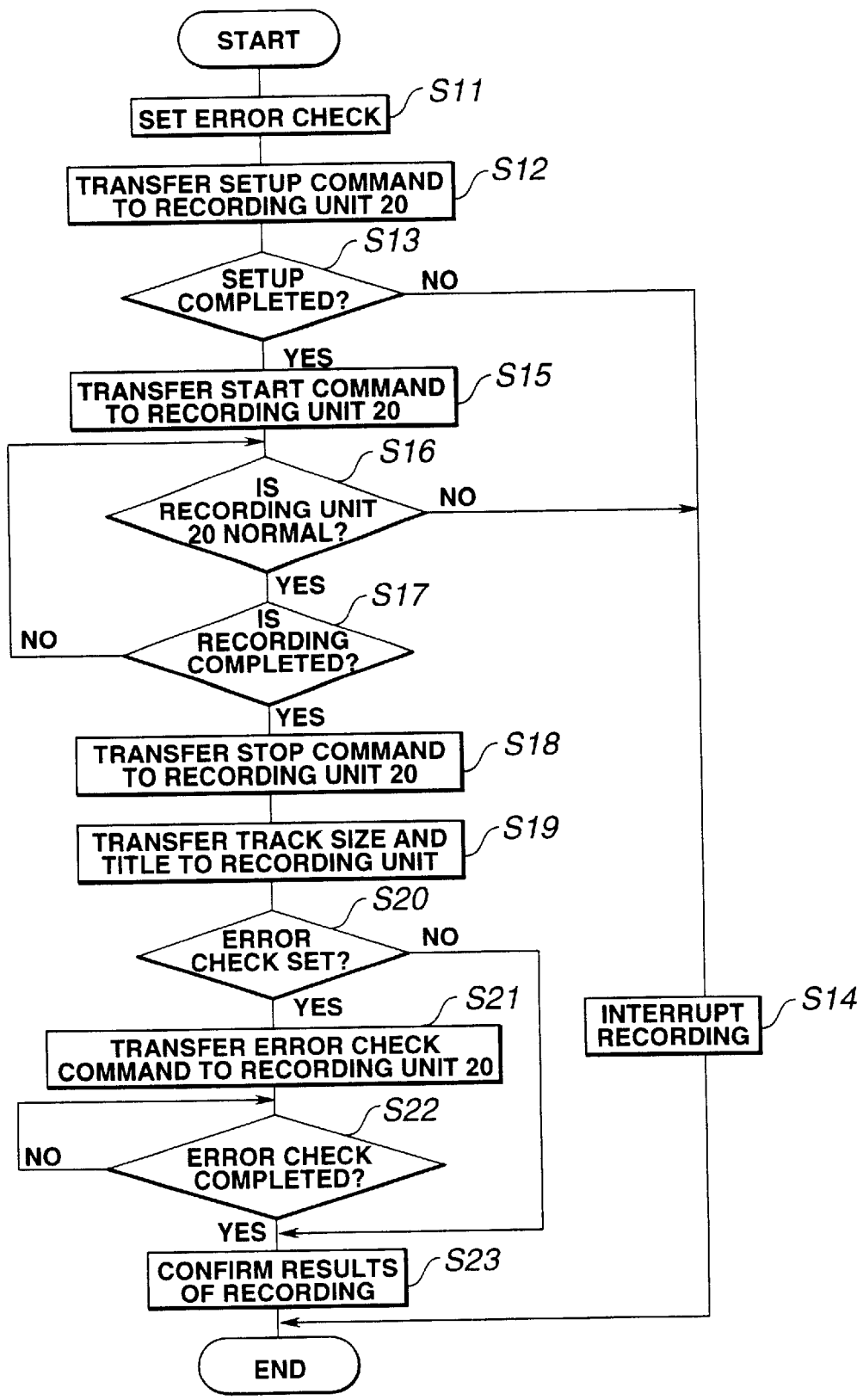
FIG. 13 is a flowchart for illustrating the dubbing processing by the recording unit 20 embodying the present invention.

When the user selects one or more contents to be recorded from the server 12 on the optical disc D and terminates the initial setting operations, such as loading of the optical disc D on the recording unit 20, the audio dubbing system 1 starts the processing as from step S11 shown in FIG. 13.

At step S11, the audio dubbing system 1 inquires the user whether or not an error check is to be performed by the display unit 14. If the user enters whether or not the error check is to be made using the actuating input unit 13, processing transfers to step S12. This error check will be explained in detail subsequently.

At step S12, the audio transfer unit 10 furnishes the setup command (SETUP) via a COMMAND line 2c to the recording unit 20. When the setup command (SETUP) is supplied from the audio transfer unit 10, the recording unit 20 sets the recording state on the optical disc D in the recording paused state and sends the acknowledgment signal (ACKNOWLEDGE) via ACK line 2d to the audio transfer unit 10.

At step S13, the audio transfer unit 10 checks to see whether or not the acknowledgment signal (ACKNOWLEDGE) has been sent from the recording unit 20. If the acknowledgment signal (ACKNOWLEDGE) has been sent, processing transfers to step S15. If the acknowledgment signal (ACKNOWLEDGE) has not been sent for a pre-set time, processing transfers to step S14.

At step S14, the audio transfer unit 10 deems that recording on the optical disc D by the recording unit 20 is disabled by some trouble and displays an error message on the display 14 to terminate the processing.

At step S15, the audio transfer unit 10 sends the start command (START) over the COMMAND line 2c to the recording unit 20. On reception of the request signal (Data Req), the recording unit 20 sends ATRAC data to the audio transfer unit 10 every pre-set capacity. On reception of the ATRAC data, the recording unit 20 records data in the recordable area of the optical disc D.

Meanwhile, if plural tracks are designated by the user, that is if plural contents are designated, the audio transfer unit 10 sends the ATRAC data as a continuous data stream to the recording unit 20. The recording unit 20 also pre-stores the TOC information of the disc in the external memory or the like, so that, if recording on the optical disc is not carried out regularly, the optical disc D can be restored to the pre-recording disc state.

If recording of the ATRAC data is started at step S15, processing transfers to step S16.

At step S16, the audio transfer unit 10, the audio transfer unit 10 sends the recording state confirming command ALRIGHT over the COMMAND line 2c to confirm the recording state of the recording unit 20. If the audio transfer unit 10 is fed from the recording unit 20 with the acknowledgment signal (ACKNOWLEDGE) and has confirmed that the recording state is normal, processing transfers to step S17 to confirm that the recording has come to a close. If the recording has not come to a close, processing reverts to step S16 to confirm whether or not recording has been performed regularly. That is, the processing of steps S16 and S17 confirms, at a pre-set interval, whether or not recording has been normal and whether or not recording has come to a close.

If it is deemed by the recording unit 20 that the recording has not been regular, processing transfers from step S16 to step S14 to interrupt the recording processing. At this time, the previous TOC information reserved in the external memory or the like is rewritten on the optical disc D for restoring the optical disc D to the pre-recording state.

If it is judged that the recording has come to a close, processing transfers from step S17 to step S18.

At step S18, the audio transfer unit 10 sends a stop command (STOP) over the COMMAND line 2c to the recording unit 20. On reception of the STOP command, the recording unit 20 terminates the recording of the ATRAC data. When the STOP command is fed at step S18, processing transfers to step S19.

At step S19, the audio transfer unit 10 furnishes the TOC0 information command (TOC0info), track size information, title command (Title), number of letters of the title and character data or the like necessary TOC information.

On reception of the TOC information, the recording unit 20 records data from the U-TOC0 to the U-TOC4 of the optical disc D, based on the furnished TOC information. Meanwhile, the start address and the end address of each track are generated on the basis of the track size information supplied next to the TOC0 information command (TOC0info). That is, since the ATRAC data is furnished as a sole data stream, this data stream is divided from track to track into data sizes to generate the TOC information.

After furnishing the necessary TOC information at step S19, processing transfers to step S20.

At step S20, the audio transfer unit 10 judges whether or not the user has set for performing an error check at the previous step S11. If the user set for performing an error check, processing transfers to step S21 and, if otherwise, processing transfers to step S23.

At step S21, the audio transfer unit 10 sends an error check command over the COMMAND line 2c to the recording unit 20. On reception of the error check command, the recording unit 20 reads out the recorded ATRAC data to inspect whether or not there is any error in the recorded data.

When the error check by the recording unit 20 is started, the audio transfer unit 10 is in stand-by state at step S22 until the error check comes to a close. On termination of the error check, processing transfers to step S23.

At step S23, the audio transfer unit 10 displays the results of the test on the display unit 14. If the result of the error check has revealed that there is any error caused in the recorded data, the pre-recording TOC information reserved if, for example, the external memory, is recorded on the optical disc D.

After displaying the test results at step S23, the audio dubbing system 1 terminates the processing.

By processing from step S11 to step S23, the audio dubbing system 1 can positively record the ATRAC data on the optical disc D.

In the above-described processing from step S11 to step S23, the necessary TOC information is sent to the recording unit 20 after recording all of the ATRAC data. However, the audio dubbing system 1 can also send the TOC information before the audio transfer unit 10 sends the ATRAC data to, the recording unit 20.

That is, the processing of step S19 is performed after terminating the setup and before sending the start command (START), that is between the processing at step S13 and that at step S15. Since the TOC information is recorded by the recording unit 20 after recording the ATRAC data on the optical disc D, the TOC information previously furnished needs to be stored in, for example, the external memory.

It is also possible with the audio dubbing system 1 to furnish the TOC information in parallel at the same time as the audio transfer unit 10 is furnishing the ATRAC data to the recording unit 20.

That is, since the ATRAC data and the commands are sent separately over the ATRAC line 2a and over the COMMAND line 2c, the processing of steps S16 and S17 and that of step S19 can be carried out in parallel thus shortening the data transfer time. It is similarly necessary in this case for the recording unit 20 to save the TOC information in, for example, the external memory, so that the TOC information will be recorded on the optical disc D after recording all of the ATRAC data.

In the above-described processing from step S11 to step S23, the ATRAC data corresponding to plural contents are handled as a sole data stream and the information required for generating the TOC information is sent separately from the audio transfer unit 10 to the recording unit 20. However, when plural contents are specified by the user, it is also possible for the audio dubbing system 1 to record ATRAC data corresponding to a sole contents on the optical disc D, generate and record the TOC of the subsequently recorded ATRAC data and to record the ATRAC data corresponding to the further following contents.

The above processing can be realized by the processing from step S15 to step S19 constituting a loop repeated from one contents to another.

Specifically, the recording of two musical numbers of the musical contents on the optical disc D is hereinafter explained by referring to a timing chart.

Figures 14A, 14B:
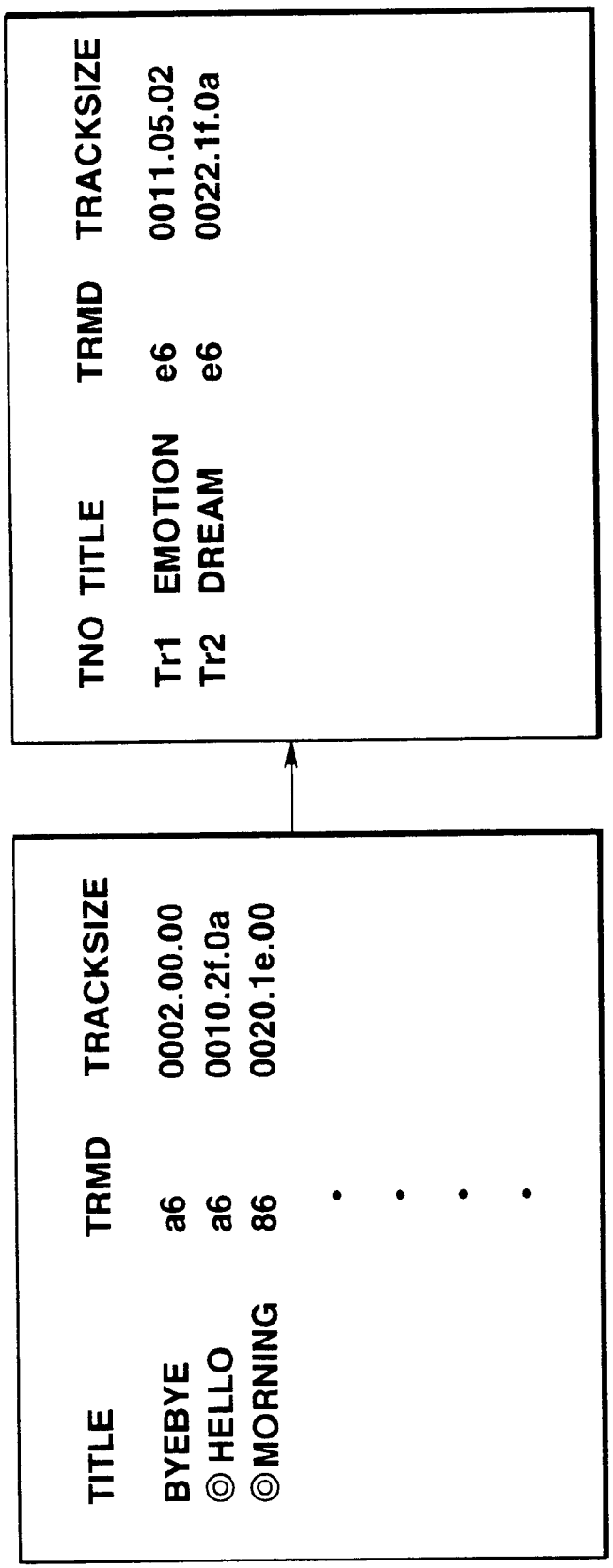
FIG. 14A shows the management information for the music program stored in a server embodying the present invention.
FIG. 14B shows the management information for the music program recorded on an optical disc embodying the present invention.

Referring to FIG. 14a, there are stored in the server 12 first contents having a title "Bye-bye", a track mode (trmd) of "a6" and a track size of "000.2.00.00", second contents having a title "Hello", a track mode (trmd) of "a6" and a track size of "0010.2f.0a" and third contents having a title "Morning", a track mode (trmd) of "86" and a track size of "0020.1e.00".

On the optical disc D as a recording medium, there are recorded two musical numbers, namely a first track having the title "Emotion", a track mode (trmd) of "e6" and a track size "0011.05.02" and a second track having the title "Dream", a track mode (trmd) of "e6" and a track size "0022.1f.0a", as shown in FIG. 14b.

For recording the second contents (ATRAC data having the title "Hello") and the third contents (ATRAC data having the title "Morning"), stored in the server 12, the processing is carried out as shown in FIGS. 15 to 18.

FIG. 15 shows a timing chart for command data between the audio transfer unit 10 and the recording unit 20 when transferring ATRAC data.

First, transfer unit 10 sends a setup command (SET UP) at time t31 to the recording unit 20. On reception of the setup command (SET UP), the recording unit 20 sets up a recording paused state and furnishes the acknowledgment signal (ACKNOWLEDGE) at time t32 to the audio transfer unit 10. On reception of the acknowledgment signal (ACKNOWLEDGE), the audio transfer unit 10 furnishes the reset command (ACK-RESET) to the recording unit 20 to reset the acknowledgment signal (ACKNOWLEDGE).

The audio transfer unit 10 furnishes at time t33 a start command (START) to the recording unit 20. This furnishing of the start command (START) corresponds to the above-mentioned processing at step S15. On reception of the start command (START), the recording unit 20 starts the recording operation, at the same time as it furnishes the acknowledgment signal (ACKNOWLEDGE) and the request signal (Data Req) to the audio transfer unit 10.

Based on the request signal (Data Req), the audio transfer unit 10 starts supplying at time t34 the ATRAC data of a pre-set capacity, that is the second contents (ATRAC data having a title "Hello" and the third contents (ATRAC data having the title "Morning"), to the recording unit 20. For furnishing ATRAC data every pre-set capacity, the audio transfer unit 10 sequentially furnishes the ATRAC data to the recording unit 20 based on the request signal (Data Req) supplied at time points t35, t36, t37 and t38 from the recording unit 20.

The audio transfer unit 10 furnishes the recording state confirming command (ALRIGHT) at a pre-set interval to check to see whether or not the recording state of the recording unit 20 is normal. This furnishing of the recording state confirming command (ALRIGHT) to see whether or not the recording state of the recording unit 20 is normal corresponds to the processing at the above-mentioned processing at step S16.

When the audio transfer unit 10 judges that all ATRAC data has been sent to the recording unit 20, it sends the stop command (STOP) at time t39 to the recording unit 20. The processing of furnishing the stop command (STOP) corresponds to the processing at step S18. If the stop command (STOP) is furnished and the furnished ATRAC data in its entirety is recorded on the optical disc D, the recording unit 20 terminates the recording at time t40 while furnishing the acknowledgment signal (ACKNOWLEDGE) to the audio transfer unit 10.

Figures 16A, 16B, 16C, 16D:
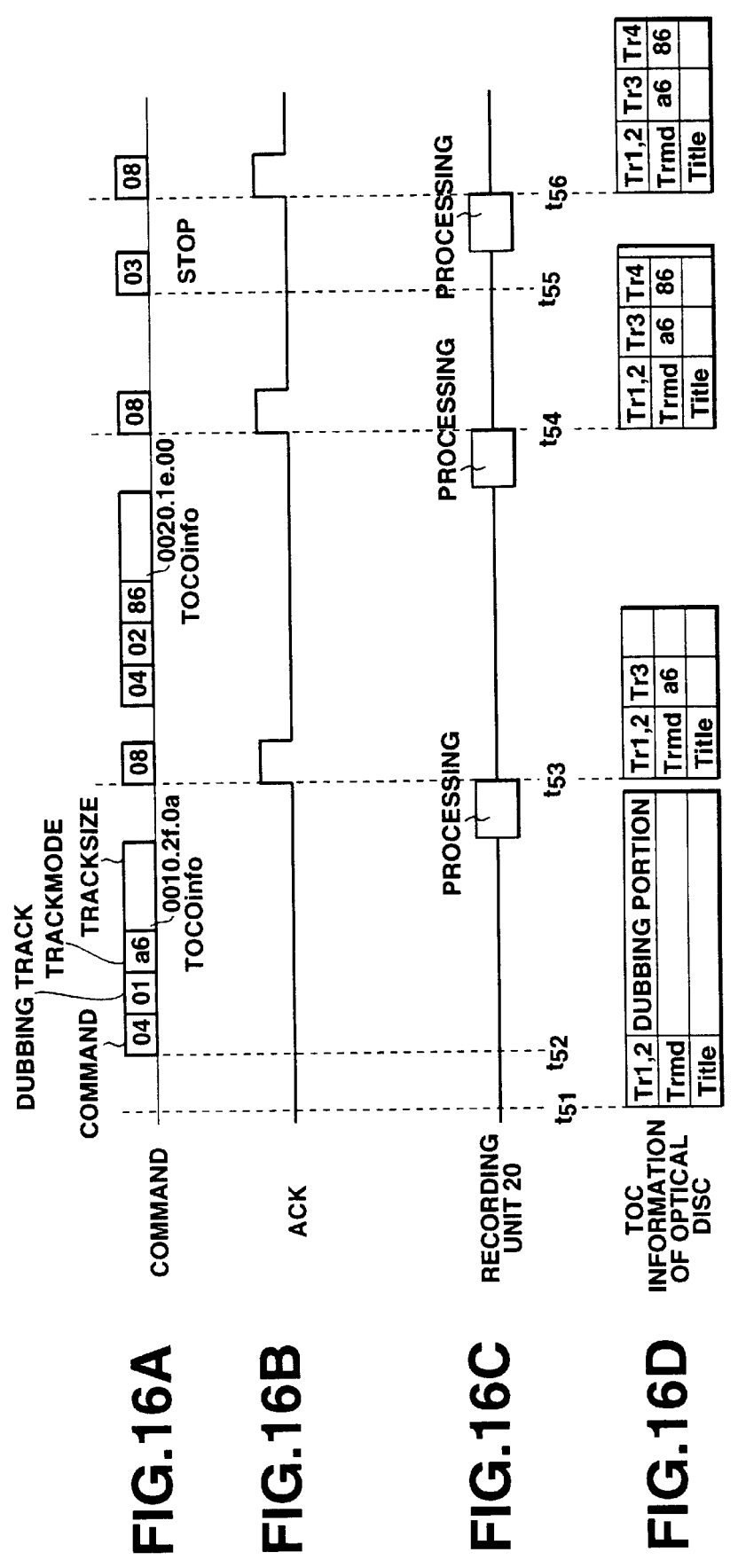

FIG. 16 shows a timing chart of the TOC0 information command (TOC0info) sent at the above-mentioned step S20 from the audio transfer unit 10 to the recording unit 20. FIGS. 16a and 16b show a time chart of data sent from the audio transfer unit 10 to the recording unit 20 and a recording state of the U-TOC0 of the optical disc D at each time point, respectively.

At a time point t51 when no TOC0 information command (TOC0info) is supplied, there are recorded start and end addresses and the track mode of previously recorded first and second tracks (track having the title "Emotion" and track having the title "Dream") in the U-TOC0 of the optical disc D. In U-TOC0 of the optical disc are recorded start and end addresses and the track mode of compressed audio data recorded provisionally as the third track. The compressed audio data recorded provisionally as the third track is transmitted as a sole datastream even although audio data of the track corresponding to two musical numbers are transmitted from the audio transmission unit 10. The recording unit 20 handles this datastream as a sole track to record audio data. That is, the recording unit 20 splits the audio data handled as a sole track by generating the TOC information in the subsequent processing.

The audio transfer unit 10 furnishes at time t52 the track mode and the track size of the first contents. That is, the audio transfer unit 10 furnishes, along with the TOC0 information command (TOC0info), the number of the contents of the ATRAC data having the title "Hello", the track mode of the contents and the track size of the contents.

On reception of the track mode and the track size of the first contents, the recording unit 20 generates the U-TOC0 information, based on the furnished information, to record the generated information on the optical disc D. Thus, at time t53, the track mode, start address and the end address associated with the first contents are recorded in TOC0 of the optical disc D.

The audio transfer unit 10 then sends at time t53 the track mode and the track size of the second contents. That is, the audio transfer unit 10 sends, along with the TOC0 information command (TOC0info), the contents number of the ATRAC data having the title "Morning", as well as the tack mode and the track size of the contents.

On reception of the track mode and the track size of the second contents, the recording unit 20 generates the U-TOC0 information based on the furnished information to record the generated information on the optical disc D. Thus, at time t54, the track mode, start address and the end address associated with the second contents are recorded in the U-TOC0 of the optical disc D.

The audio transfer unit 10 sends at time t55 a stop command (STOP). On reception of the stop command (STOP), the recording unit 20 judges that the processing corresponding to the previously furnished TOC0 information command (TOC0info) has come to a close and, acting on the assumption that there is no data downstream of the end address corresponding to the second contents, proceeds to the processing of deleting the surplus.

Thus, at time t56, there is recorded in the U-TOC0 of the optical disc D the track having the title "Hello" and the track having the title "Morning" in succession along with the previously recorded U-TOC0 data of the first and second tracks.

FIGS. 17 and 18 are time charts for the title information supplied at the above-mentioned step S20 from the audio transfer unit 10 to the recording unit 20. Meanwhile, FIGS. 17a and 18a show time charts of data furnished from the audio transfer unit 10 to the recording unit 20 and FIGS. 17b and 18b show the recording states of the U-TOC1 and 4 of the optical disc D at each time point.

Referring to FIG. 17, there are recorded only the previously recorded titles of the first and second tracks in the U-TOC1 and U-TOC4 of the optical disc D at the time point t61 when the title command (Title) is not supplied.

The audio transfer unit 10 sends at time t62 the title of the first contents. That is, the audio transfer unit 10 sends the contents number of the ATRAC data, number of letters supplied and letter data of the title "Hello" of the contents, along with the title command (Title).

On reception of the title of the first contents, the recording unit 20 generates the information of U-TOC1 and U-TOC4, based on the furnished information, to record the generated information on the optical disc D.

Meanwhile, if the number of letters of the title is larger than the prescribed value, processing is executed in plural installments. That is, if data for four letters only can be furnished, the four letters of "Hell" are first sent and the letter "o" is then sent at time t64.

Thus, at time t65, the title corresponding to the first contents is recorded on the U-TOC1 and U-TOC4 of the optical disc D.

The audio transfer unit 10 then furnishes the title of the second contents at time t66 in FIG. 18. That is, the audio transfer unit 10 furnishes, along with the title command (Title), the contents number of the ATRAC data, the number of letters furnished and the letter data of the title "Morning" of the contents. On reception of the second contents, the recording unit 20 generates the information of U-TOC and U-TOC4, based on the furnished information, in order to record the generated information on the optical disc D.

Thus, at time t65, there is recorded on U-TOC1 of the optical disc D a title corresponding to the second contents.

When the recording unit 20 terminates the recording of all titles, the audio transfer unit 10 sends a stop command (Stop) at time t68 to terminate the processing.

By the above processing, the audio dubbing system 1 can record the TOC information on the optical disc D. That is, there can be recorded on the optical disc D the third track with the title "hello", the fourth track with the title "Morning" recorded from the server 12 and the ATRAC information along with the previously recorded first track with the title "Emotion" and second track with the title "Dream".

With the audio dubbing system 1, as described above, the audio transfer unit 10 transfers the track size of each track along with the ATRAC data and the recording unit 20 splits the data stream recorded on the optical disc D to record the start address and the end address of each track on U-TOC of the optical disc D. This allows the audio dubbing system 1 to record efficiently the track selected by the user on the optical disc D; The recording unit 20 records the ATRAC data as a track responsive to the transferred data stream, while recording the start and end addresses of each track on the optical disc D in the style of splitting the data stream of this one track for improving the utilization efficiency of the optical disc D.

Referring to the drawings, an audio dubbing system of a second embodiment of the present invention, as modified from the above-described first embodiment of the audio dubbing system 1, is explained. In the following description of the audio dubbing system of the second embodiment, the same component elements as those of the above-described audio dubbing system. 1 are depicted by the same reference numerals and the detailed description thereof is omitted for simplicity.

Figure 20:
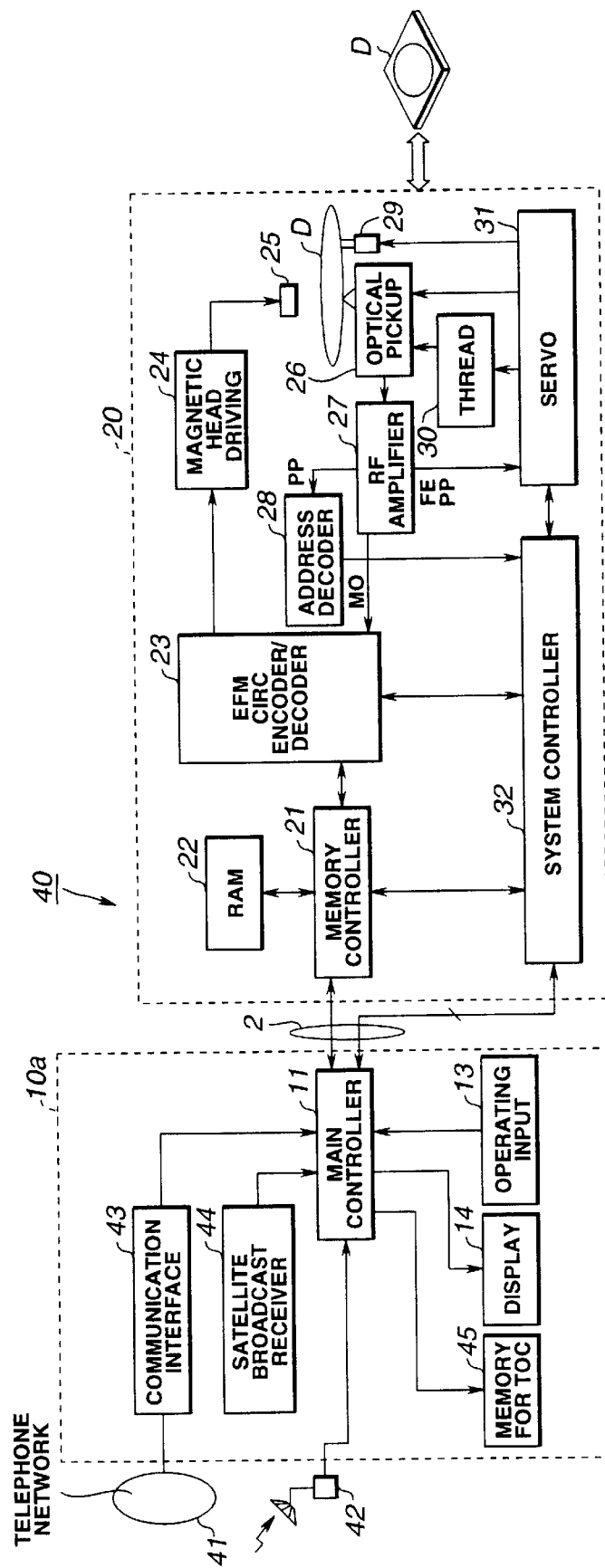
FIG. 20 is a detailed block diagram showing a reception apparatus side including the recording unit 20 of a distribution system according to the present invention.

FIG. 20 is a block diagram for illustrating an audio dubbing system 40 according to the second embodiment.

The audio dubbing system 40 includes an audio receiver 10a, a main controller 11, a server 12, an actuating input unit 13, a display 14, a communication interface 43 operating as an interface with a telephone network 41, a satellite broadcast receiver 44 for receiving satellite broadcast over an antenna 42 and a TOC memory 45 for storing the TOC information, and a recording unit 20.

That is, this audio dubbing system 40 is a system configured for recording audio data on an optical disc D owned by a user to purvey music contents to the user instead of purveying contents in the form of audio data stored in a medium such as a so-called compact disk or an audio tape.

For example, this audio dubbing system 40 can be installed at a station or a retail store for purveying music contents free of charge to the user, or at a music studio for use in contents supervision.

The schematics of the contents purveying configuration of the audio dubbing system 40 are first explained.

To the audio receiver 10a of this audio dubbing system 40 are transmitted ATRAC data, in the form of audio data compressed in accordance with the format of the optical disc D, via satellite broadcast or telephone network from an information transmitting base station operating as a main server.

The user confirms the contents that can be purveyed from the information transmitting base station operating as the main server by the display 14 and, selects one or more contents, using the actuating input unit 13, if there is any desired contents. The user loads the optical disc D he or she owns on the recording unit 20 to start the recording using the actuating input unit 13.

On operation by the user for starting the recording, the controller 11 of the audio receiver 10a sends the information of the selected contents via communication interface 43 to, for example, the information transmitting base station as the main server. This information transmitting base station receiving the contents information sends the ATRAC data corresponding to the contents selected by the user to the audio dubbing system 40. The audio receiver, 10a of the audio dubbing system 40 receives the transmitted ATRAC data, the recording unit 20 recording the ATRAC data furnished from the audio receiver 10a in a non-recorded area of the optical disc D.

The communication interface 43 of the audio dubbing system 40 purveying the contents includes a modem or an error correction circuit and splits the transmitted ATRAC data and TOC information from each other to send the split data to the information base station as the main server.

The satellite broadcast receiver 44 receives the ATRA-C data broadcast from the information base station as the main server to split the ATRAC data and TOC information to send the split data to the main controller 11.

Meanwhile, the ATRAC data may be transmitted over the telephone network or the satellite broadcast or by any other suitable transmission medium.

The TOC memory 45 temporarily stores the transmitted TOC information until it is written on the optical disc D.

The transmission configuration of the ATRAC data and the TOC information purveyed to the audio dubbing system 40 is hereinafter explained.

The first transmission configuration transmits the TOC information after transmitting the entire ATRAC data as shown in FIG. 21a.

As for the ATRAC data transmitted over transmission media, such as the telephone network or the satellite broadcast, ATRAC data of plural contents are furnished as sole datastream,a s shown in FIG. 21b. The main controller 11 directly sends the ATRAC data of the plural contents, thus supplied as the sole datastream, to the recording unit 20, which then records the supplied data.

As the subsequently transmitted TOC information, the information of U-TOC0 and U-TOC1, such as data size specifying the datastream length of the respective contents, or the track mode, is furnished. The recording unit 20 then records the ATRAC data as a datastream on the optical disc D and subsequently records the start and end addresses in meeting with the data size of the ATRAC data of the respective contents.

As the TOC information, it is possible to furnish not only the U-TOC0 and U-TOC1 information, such as the track size and the track mode, but also the relevant information, such as title data of the kanji code, text, text data, such as liner notes or picture data, such as photo on a jacket.

Such relevant information can be included for transmission in the TOC area as follows:

U-TOC0 . . . track information
U-TOC1 . . . title data (ASCII code)
U-TOC4 . . . title data (kanji code)
U-TOC5 . . . text data (song text or liner notes)
U-TOC6 . . . picture data (jacket photo)

The relevant information may also be recorded in the TOC area.

The ATRAC data transmitted over the transmission medium may be packetized per a pre-set transmission volume for transmission, as shown in FIG. 21c. The data is packetized, in accordance with the transmission system of the transmission medium, regardless of the divisions of the contents of the ATRAC data.

Figure 22A:
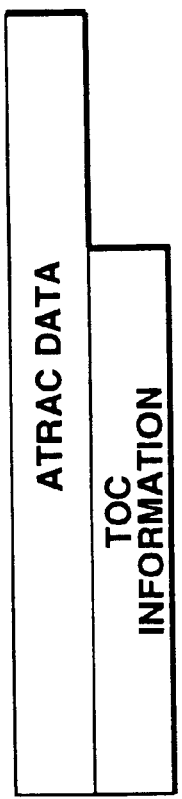
FIG. 22A is a data structure diagram when the compresses audio data and the TOC data are transmitted by time divisional multiplexing.

As the second transmission configuration, the TOC information is transmitted simultaneously with transmission of the ATRAC data, as shown in FIG. 22a.

As for the ATRAC data transmitted via a transmission medium, such as the telephone network or satellite broadcast, ATRAC data of plural contents are furnished as a sole datastream.

The TOC information, transmitted simultaneously with the ATRAC data, is stored from the communication interface 43 or the satellite broadcast receiver 44 via main controller 11 to the TOC memory 45. After the recorder 20 records the ATRAC data as the sole datastream on the optical disc D, the TOC information stored in the TOC memory 45 is read out and the start and end addresses are recorded in meeting with the data size of the ATRAC data of the respective contents.

As the TOC information, not only the U-TOC0 or U-TOC1 information, such as the track size or the track mode, but also the relevant information, such as title data of the kanji code, text, text data, such as liner notes or picture data, such as photo on a jacket, may be furnished, as in the first transmission configuration. By transmitting the ATRAC data and the TOC information simultaneously in this manner, the relevant information can be displayed for the user on the display 14 at the same time as the ATRAC data is written on the optical disc D.

Figure 22B:
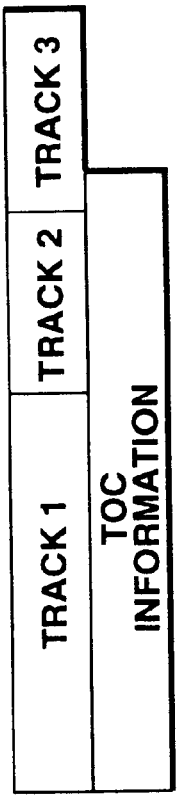
FIG. 22B is a data structure diagram showing the compressed audio data shown in FIG. 22A in further detail.
Figure 22C:
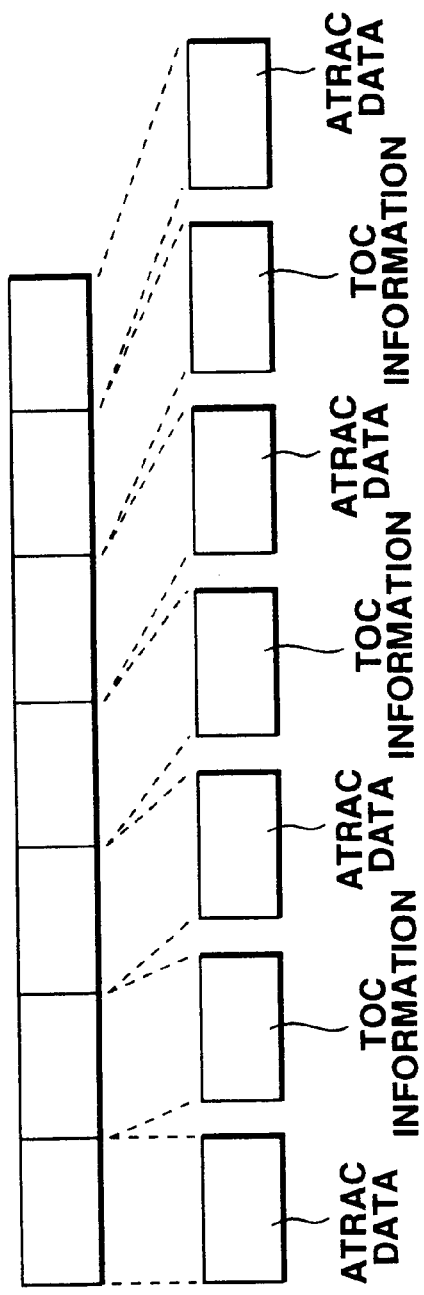
FIG. 22C is a data structure diagram for the case of dividing the compressed audio data and the TOC data into packets of predetermined length and sending the packets by time divisional multiplexing.

The ATRAC data transmitted over the transmission medium may be transmitted by being packeted per a pre-set transmission capacity, as shown in FIG. 22c. At this time, the ATRAC data and the TOC information are transmitted as it is packeted by time divisional system.

Meanwhile, in transmitting ATRAC data by satellite broadcast or telephone network, the data is received -by terminals of plural audio dubbing systems 40, an hence is sequentially transmitted at a constant rate. Thus, with the present audio dubbing system 40, it is not possible to make bidirectional exchange of transmitting data responsive to writing. However, since the data is temporarily stored in the RAM 22 of the recording unit 20, retrial can be made until overflow of the RAM22, even in case of failure in writing.

However, if there is no significant difference between the writing rate and the transfer rate, or if writing should have failed in succession despite sufficient difference, data overflows from the RAM 22 thus leading to loss of the transmitted data.

Figure 23:
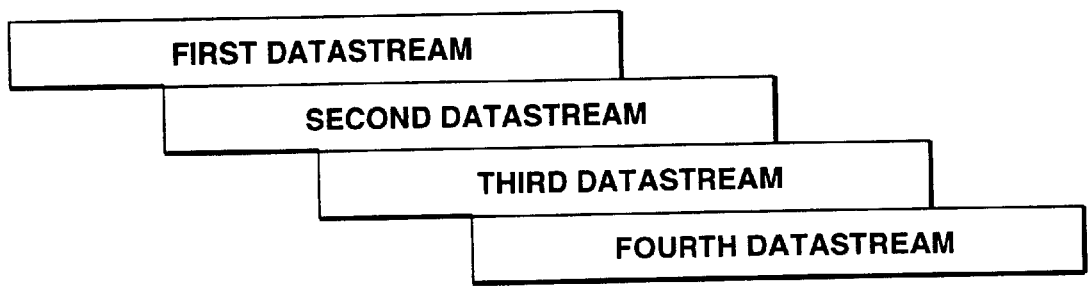
FIG. 23 is a data structure diagram for the case of shifting a compressed audio program by predetermined time intervals and transmitting the time-shifted programs by time divisional multiplexing.

Thus, with the ATRAC data transmitted by this audio dubbing system 40, the datastream is delayed by a pre-set time duration several times to provide plural identical datastreams which are transmitted to evade writing failure, as shown in FIG. 23. That is, with the audio dubbing system 40, the communication interface 43 or the satellite broadcast receiver 44 selects and receives the earliest arriving first datastream. If the audio dubbing system 40 should fail in writing the first datastream such that it is not in time for receiving this first datastream, it selects the second datastream arriving with time lag to re-start recording as from the portion of the first datastream where the writing failure occurred.

Since the time until overflow of the RAM 22 is found from the difference between the difference between the writing data and the transfer rate, the delay time between datastreams is set so as to be longer than this time.

The processing contents of the audio dubbing system 40 is explained by referring to a flowchart.

Figure 24:
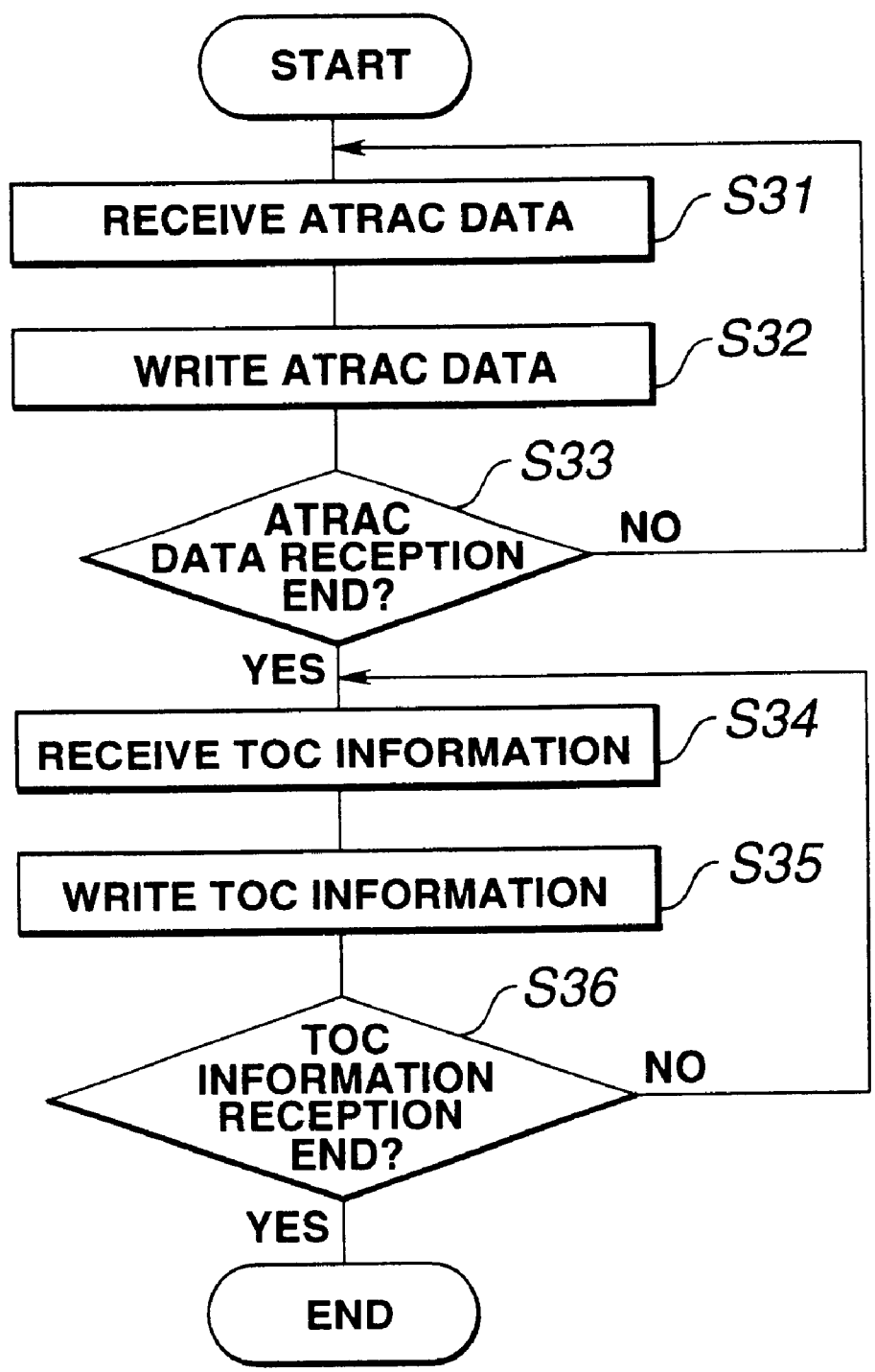
FIG. 24 is a flowchart for sequentially transmitting the compressed audio data and the TOC data.

First, the processing contents in case data is transmitted by the first transmission configuration shown in FIG. 21 are explained by referring to FIG. 24.

If the user selects the contents and transmits the information of the contents selected via the transmission medium, the audio dubbing system 40 starts processing as from step S31.

At this step S31, the audio dubbing system 40 receives the ATRAC data transmitted from the information transmitting base station via satellite broadcast or telephone network. Since the ATRAC data is transmitted in the form of, for example, packets, in accordance with the pre-set transmission system, the audio dubbing system 40 receives the ATRAC data on the packet basis. The communication interface 43 or the satellite broadcast receiver 44 decodes and corrects the ATRAC data for errors to send the resulting ATRAC data to the main controller 11.

At the next step S32, the audio dubbing system 40 writes the ATRAC data. That is, the main controller 11 sends the ATRAC data to the recording unit 20 which then records the ATRAC data on the optical disc D. The processing at step S32 is similar to that from step S11 to S17 shown in FIG. 13. The main controller 11 acquires the ATRAC data from the communication interface 43 or the satellite broadcast receiver 44 instead of acquiring the ATRAC data from the server 12.

At the next step S33, the audio dubbing system 40 checks whether or not reception of the ATRAC data has come to a close. If the entire ATRAC data has not been received, the processing from step S31 to step S33 is repeated until reception and writing of the entire ATRAC data. If it is judged that the entire ATRAC data has been received, processing transfers to step S34.

At this step S34, the TOC information transmitted from the information transmitting base station via the satellite broadcast or telephone network is received. The communication interface 43 or the satellite broadcast receiver 44 performs decoding and error correction to send the TOC information to the main controller 11.

At the next step S35, the audio dubbing system 40 writes the TOC information That is, the main controller 11 sends the TOC information to the recording unit 20 which then records the TOC information on the optical disc D. The processing at step S35 is similar to that at step S18 to S19 shown in FIG. 13. That is, the main controller 11 acquires the TOC information from the communication interface 43 or the satellite broadcast receiver 44 instead of acquiring the TOC information from the server 12.

At the next step S36, the audio dubbing system 40 checks whether or not reception of the TOC information has come to a close. If the entire TOC information has not been received, the processing as from step S34 to step S36 is repeated until reception of the entire TOC information and writing the data. If it is judged that the entire TOC information has been received, processing comes to a close.

Figure 25:
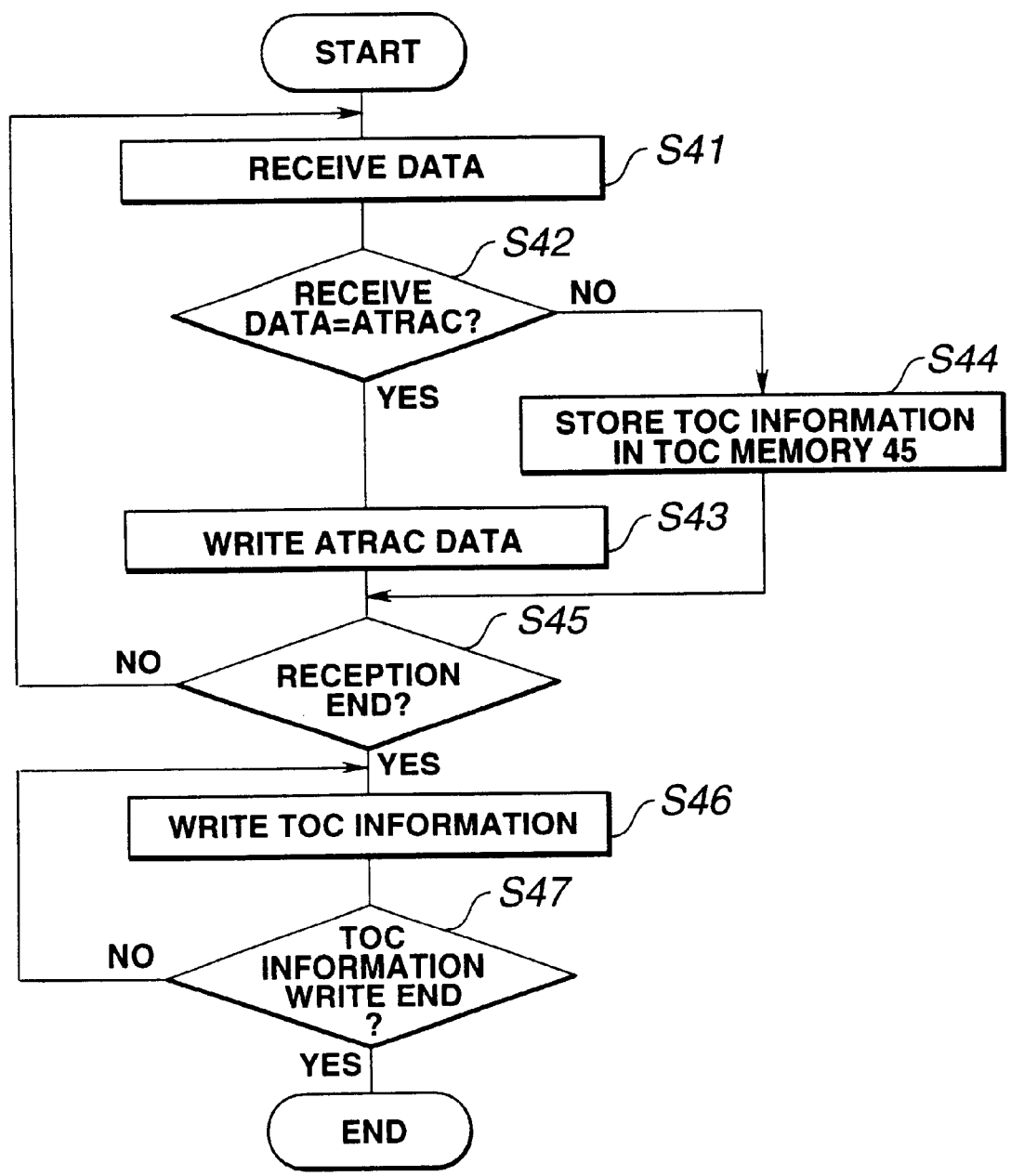
FIG. 25 is a flowchart for the case of time division multiplexing and transmitting the compressed audio data and the TOC data.

The processing contents in case of data transmission in the second transmission configuration shown in FIG. 22 is explained by referring to a flowchart shown in FIG. 25.

If the contents are selected by the user and the information of the selected contents are transmitted over the transmission medium, the audio dubbing system 40 starts processing as from step S41.

At step S41, the a40 receives ATRAC data or the TOC information transmitted from the information transmitting base station via satellite broadcast or telephone network. The ATRAC data and the TOC information are packetized and transmitted in accordance with a pre-set transmission system. The audio dubbing system 40 receives data on the packet basis. The communication interface 43 or the satellite broadcast unit 44 performs decoding and error correction.

At the next step S42, the audio dubbing system 40 judges whether the received data is the ATRAC data or the TOC information. If the audio dubbing system 40 judges that the received data is the ATRAC data, the audio dubbing system 40 proceeds to step S43 and, if otherwise, to step S44.

At step S43, the audio dubbing system 40 writes the ATRAC data. That is, this ATRAC data is sent to the recording unit 20 which then records the ATRAC data on the optical disc D. The processing of step S43 is similar to that from step S11 to S17 shown in FIG. 13. Thus, ATRAC data is acquired from the communication interface 43 or the satellite broadcast receiver 44, instead of from the server 12. After writing the ATRAC data on the optical disc D, processing transfers to step S45.

At S44, the TOC information is stored in the TOC memory 45. The reason is that this audio dubbing system 40 records the TOC information after writing the ATRAC data in the optical disc D. The TOC information stored in this TOC memory 45 may be displayed for the user using the display 14 during recording of the ATRAC data on the optical disc D.

At the next step S45, it is checked whether or not reception of all data has come to a close. If all data have not been received, the processing as from step S41 is repeated, that is the processing from step S41 to step S45 is carried out until reception and writing of all data. When it is judged that all data have been received, processing transfers to step S46.

At the next step S46, the TOC information is written, that is, the TOC information stored in the TOC memory 45 is recorded on the optical disc D. The processing of step S46 is similar to that from step S18 to step S19 shown in FIG. 13, that is, the main controller 11 acquires the TOC information from the TOC memory 45 instead of from the TOC memory 45.

At the next step S47, it is judged whether or not the writing of the TOC information has come to a close. If the entire TOC information has not been written, the processing from step S44 is repeated, that is the processing from step S46 to step S47 is performed until writing of the entire TOC information. If it is judged that the TOC information has been written in its entirety, the processing comes to a close.

Figure 26:
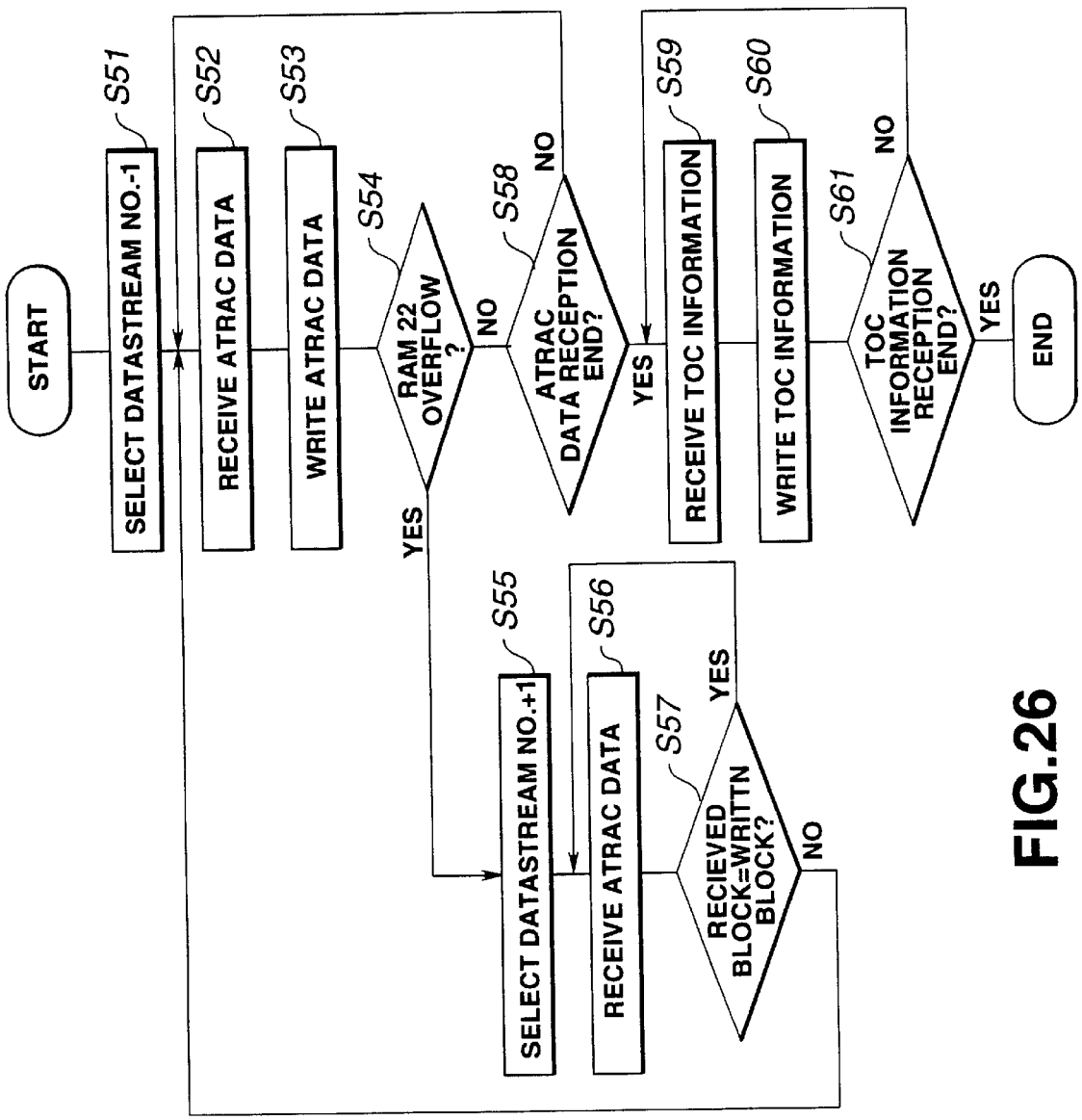
FIG. 26 is a flowchart for the case of shifting a compressed audio program by predetermined time intervals and transmitting the shifted programs by time divisional multiplexing.

The processing contents in case of multiplexing and transmitting plural identical datastreams each with a pre-set time lag shown in FIG. 23 is explained with reference to a flowchart shown in FIG. 26.

If the contents are selected by the user, and the information of the contents selected via the transmission medium is sent, the audio dubbing system 40 starts processing from step S51.

At step S51, the audio dubbing system 40 selects the number 1 of the received data stream numbers. That is, the audio dubbing system 40 selects the first sent datastream.

At step S52, the audio dubbing system 40 receives the ATRAC data transmitted from the information transmitting base station over the broadcasting satellite or the telephone network. Since the transmitted ATRAC data is packeted in accordance with a pre-set transmission system, the audio dubbing system 40 receives the data on the packet basis. The communication interface 43 or the satellite broadcast receiver 44 processes the received ATRAC data with decoding and error correction to send the processed data to the main controller 11.

At the next step S53, the audio dubbing system 40 writes the ATRAC data. That is, the main controller 11 sends the ATRAC data to the recording unit 20 which then records the ATRAC data on the optical disc D. The processing at this step S53 is to that from step S11 to step S17 shown in FIG. 13, that is, the main controller 11 acquires the TOC information from the communication interface 43 or from the satellite broadcast receiver 44 instead of from the server 12.

At the next step S54, the recording unit 20 judges whether or not overflow has been caused in the data stored in the RAM 22 of the recording unit 20. The audio dubbing system 40 can make re-trial until overflow of data occurs from the RAM 22 even if writing on the optical disc D has resulted in failure. If writing has resulted in failure on end, data overflows from the RAM 22, so that the received data is lost. That is, it is judged whether or not the received data has overflowed before writing the data on the optical disc D. If it is judged that the data overflow has occurred, processing transfers to step S55 and, if otherwise, to step S58.

At the next step S55, it is judged whether or not reception of the ATRAC data has come to a close. If the ATRAC data has not received in its entirety, the processing as from step S52 is repeated, that is, the processing from step S52 to step S58 is repeated until reception and writing of all ATRAC data. If it is judged that all ATRAC data have been received, processing transfers to step S59.

If it is judged at step S54 that overflow of the data in RAM 22 has occurred, the selected datastream number is incremented by one at step S55.

At the next step S56, the ATRAC data of the datastream incremented by one is received. At the next step S57, it is judged whether or not the ATRAC data received at step S56 is the previously written data. If the data is the pre-written data, the processing from step S56 is repeated. That is, the processing of steps S56 and S57 is repeated until acquisition of data which has resulted in failure in writing due to errors or the like. On reception of the ATRAC data which has resulted in failure in writing due to errors, the processing as from step S52 is repeated.

On completion of reception of all ATRAC data, the transmitted TOC information from the information transmitting base station via the satellite broadcast or the telephone network is received at step S59. The communication interface 43 or the satellite broadcast receiver 44 processes the TOC information with decoding and error correction to store the processed TOC information in the TOC memory 45.

At the next step S60, the TOC information is written, that is, the main controller 11 sends the TOC information to the recording unit 20 which then records the TOC information on the optical disc D. The processing at step S55 is similar to that from step S18 to step S19 shown in FIG. 13, that is, the main controller 11 acquires the TOC information from the communication interface 43 or the satellite broadcast receiver 44 instead of from the server 12.

At the next step S61, it is judged whether or not reception of the TOC information has come to a close. If the entire TOC information has not been received, the processing from step S59 is repeated, that is the processing from step S59 to step S61 is performed until writing of the entire TOC information. If it is judged that the TOC information has been received in its entirety, the processing comes to a close. Although not stated in this flowchart, it is of course possible to update the above-mentioned datastream number to execute the processing of receiving the next datastream if the processing of writing the TOC information on the optical disc has resulted in failure.

The processing from step S51 to step S61 is the processing corresponding to application of the transmission configuration of multiplexing and transmitting the plural identical datastreams each having the same time lag to the processing of transmitting the data in the first transmission configuration shown in FIG. 21. Alternatively, the processing may also be such a one corresponding to application of the above transmission configuration to the processing of transmitting the data in the first transmission configuration shown in FIG. 22.

With the audio dubbing system 40 of the present embodiment, data to be written on the optical disc D can be received over a transmission medium, such as satellite broadcast, so as to be written on the optical disc D.

Also, with the audio dubbing system 40, failure in writing on the optical disc can be recovered by receiving data which is the multiplexed plural identical data each having pre-set time lag.

In addition, with the audio dubbing system 40, the relevant information, including the kanji code, such as the title data, text data, such as text of the song or the liner notes or photo data, such as jacket photos, can be stored on the optical disc D by receiving the TOC information containing this relevant information. Also, the relevant information can be displayed during recording of the ATRAC data on the optical disc.

Th connection cable 2 between the audio receiver 10a and the recording unit 20 may also be a transmission cable of, for example, the IEEE1394 system.

What is claimed is:

1. A distribution system comprising:

blocking means for forming into packets a compressed audio program distributed from an information center and relevant information concerning a data size of the compressed audio program;

transmitting means for transmitting the compressed audio program and the relevant information formed into packets by the blocking means by time division multiplexing;

reception means for receiving the compressed audio program and the relevant information transmitted from the transmitting means by time division multiplexing;

separation means for separating the compressed audio program from the relevant information for each packet received by the reception means;

recording means for recording on a recording medium the compressed audio program separated by the separation means; advising means for advising a user of the data size of the compressed audio program included in the relevant information separated by the separation means;

determining means for determining a recordable residual capacity of the recording medium;

comparator means for comparing the data size of the compressed audio program included in the relevant information separated by the separation means to the recordable residual capacity of the recording medium; and storage means for temporarily storing the compressed audio program separated by the separation means, wherein the recording means records the compressed audio program read out from the storage means; and detecting means for detecting a recording capacity of the storage means, wherein the advising means issues an alarm if, as a result of comparison by the comparator means, the data size of the compressed audio program exceeds the recordable residual capacity of the recording medium and wherein the transmitting means transmits a first transmission of a pre-set audio program and after a delay time the transmitting means transmits a second transmission of the pre-set audio program, and wherein if the compressed audio program stored in the storage means exceeds a predetermined size, the reception means switches to receive the second transmission of the pre-set audio program which is stored in the storage means.

2. The distribution system as recited in claim 1, wherein the relevant information includes title information concerning the distributed compressed audio program.

3. The distribution system as recited in claim 2, wherein the advising means displays a title name based on the title information concerning the distributed compressed audio program.

4. The distribution system as recited in claim 3, wherein the advising means displays the title name based on picture information concerning the distributed compressed audio program.

5. The distribution system as recited in claim 1, wherein the relevant information includes picture information concerning the distributed compressed audio program.

6. The distribution system as recited in claim 1, wherein the delay time is longer than a storage time of the compressed audio program stored in the storage means.

7. A distribution method comprising the steps of:

blocking a compressed audio program distributed from an information center and relevant information concerning a data size of the compressed audio program into packets;

transmitting the compressed audio program and the relevant information blocked into packets by the blocking means by time division multiplexing;

receiving the compressed audio program and the relevant information transmitted from the transmitting means by time division multiplexing;

separating the received audio program and the relevant information;

recording the compressed audio program separated by the separation means on a removable recording medium; and advising a user of the data size of the compressed audio program included in the relevant information;

determining a recordable residual capacity of the removable recording medium;

comparing the data size of the compressed audio program to the recordable residual capacity of the removable recording medium;

issuing an alarm if the data size of the compressed audio program exceeds the recordable residual capacity of the removable recording medium;

storing in a storage area the compressed audio program recorded on the removable recording medium;

detecting a recording capacity of the storage area; and transmitting a first transmission of a pre-set audio program and after a delay time transmitting a second transmission of the pre-set audio program, wherein if the compressed audio program stored in the storage area exceeds a predetermined size, switching reception to receive the second transmission of the pre-set audio program which is stored in the storage area.

8. A reception apparatus for receiving data obtained by blocking a distributed compressed audio program and relevant information concerning a data size of the compressed audio program into packets and by transmitting the packets of the compressed audio program and the relevant information from an information center by time division multiplexing; comprising:

reception means for receiving the compressed audio program and the relevant information concerning the compressed audio program transmitted from the information center by time division multiplexing;

separating means for separating the compressed audio program and the relevant information received by the reception means;

recording means for recording on a recording medium the compressed audio program separated by the separating means; and advising means for advising a user of the data size of the compressed audio program included in the relevant information;

determining means for determining a recordable residual capacity of the removable recording medium;

comparator means for comparing the data size of the compressed audio program to a recordable residual capacity of the removable recording medium;

storage means for temporarily storing the compressed audio program separated by the separating means, wherein the recording means records the compressed audio program read out from the storage means; and detecting means for detecting a recording capacity of the storage means, wherein the advising means issues an alarm if, as a result of comparison by the comparator means, the data size of the compressed audio program exceeds the recordable residual capacity of the removable recording medium, wherein the transmitting means transmits a first transmission of a pre-set audio program and after a delay time the transmitting means transmits a second transmission of the pre-set audio program, and wherein if the compressed audio program stored in the storage means exceeds a predetermined size, the reception means switches to receive the second transmission of the pre-set audio program which is stored in the storage means.

9. A reception method for receiving data obtained by distributing and blocking a compressed audio program and relevant information concerning a data size of the compressed audio program into packets and by transmitting the packets of the compressed audio program and the relevant information from an information center by time division multiplexing, comprising the steps of:

receiving the compressed audio program and the relevant information concerning the distributed audio program transmitted from the information center by time division multiplexing;

separating the received compressed audio program and the relevant information;

recording the compressed audio program separated by the separating means on a removable recording medium; and advising a user of the data size of the compressed audio program included in the relevant information;

determining a recordable residual capacity of the removable recording medium;

comparing the data size of the compressed audio program to a recordable residual capacity of the removable recording medium;

issuing an alarm if the data size of the compressed audio program exceeds the recordable residual capacity of the removable recording medium;

storing in a storage area the compressed audio program recorded on the removable recording medium;

detecting a recording capacity of the storage area; and transmitting a first transmission of a pre-set audio program and after a delay time transmitting a second transmission of the pre-set audio program, wherein if the compressed audio program stored in the storage area exceeds a predetermined size, switching reception to receive the second transmission of the pre-set audio program which is stored in the storage area.

* * * * *